United States Patent
Ellis

(10) Patent No.: US 9,177,415 B2
(45) Date of Patent: Nov. 3, 2015

(54) METHODS OF AND APPARATUS FOR ENCODING AND DECODING DATA

(71) Applicant: ARM Limited, Cambridge (GB)

(72) Inventor: Sean Tristram Ellis, Farnham (GB)

(73) Assignee: ARM LIMITED, Cambridge (GB)

(*) Notice: Subject to any disclaimer, the term of this patent is extended or adjusted under 35 U.S.C. 154(b) by 190 days.

(21) Appl. No.: 13/753,921

(22) Filed: Jan. 30, 2013

(65) Prior Publication Data

US 2014/0210840 A1    Jul. 31, 2014

(51) Int. Cl.
| | |
|---|---|
| *G06K 9/36* | (2006.01) |
| *G06K 9/40* | (2006.01) |
| *G09G 5/00* | (2006.01) |
| *G06T 17/20* | (2006.01) |
| *G06T 11/40* | (2006.01) |
| *G06T 15/04* | (2011.01) |
| *G06T 9/00* | (2006.01) |
| *H04N 19/119* | (2014.01) |
| *H04N 19/172* | (2014.01) |
| *H04N 19/593* | (2014.01) |
| *H04N 19/463* | (2014.01) |
| *H04N 19/154* | (2014.01) |

(52) U.S. Cl.
CPC . *G06T 15/04* (2013.01); *G06T 9/00* (2013.01); *H04N 19/119* (2014.11); *H04N 19/172* (2014.11); *H04N 19/463* (2014.11); *H04N 19/593* (2014.11); *H04N 19/154* (2014.11)

(58) Field of Classification Search
USPC ......... 345/418–419, 423, 582–583, 587, 589, 345/606, 611, 501, 520, 522, 552; 382/232–233, 235, 254, 266, 268, 269, 382/274, 276, 285, 302, 171, 173
See application file for complete search history.

(56) References Cited

U.S. PATENT DOCUMENTS

| | | | |
|---|---|---|---|
| 5,046,119 A | 9/1991 | Hoffert | |
| 5,047,853 A | 9/1991 | Hoffert | |
| 5,956,431 A | 9/1999 | Iourcha | |
| 5,978,034 A * | 11/1999 | Hosaka | .................. 375/240.16 |
| 6,292,590 B1 | 9/2001 | Kondo et al. | |
| 6,298,169 B1 | 10/2001 | Guenter | |
| 6,775,417 B2 | 8/2004 | Hong | |

(Continued)

FOREIGN PATENT DOCUMENTS

| | | |
|---|---|---|
| EP | 0859517 A2 | 8/1998 |
| EP | 1280359 A2 | 1/2003 |

(Continued)

OTHER PUBLICATIONS

Office Action dated Sep. 18, 2014 in U.S. Appl. No. 13/464,686, 29 pages.

(Continued)

*Primary Examiner* — Wesner Sajous
(74) *Attorney, Agent, or Firm* — Vierra Magen Marcus LLP

(57) ABSTRACT

When encoding an array of texture data elements to be used in a graphics processing system, the array of texture data elements is divided into a plurality of non-rectangular sub-sets of texture data elements, and each non-rectangular sub-set of texture data elements that the texture has been divided into is then encoded to generate an encoded texture data block representing that non-rectangular sub-set of the texture data elements, to thereby provide a set of encoded texture data blocks representing the texture.

26 Claims, 7 Drawing Sheets

(56) References Cited

U.S. PATENT DOCUMENTS

| | | | |
|---|---|---|---|
| 6,937,250 | B1 | 8/2005 | Schilling |
| 6,940,511 | B2 | 9/2005 | Akenine-Moller |
| 7,242,811 | B2 | 7/2007 | Fenney |
| 7,734,105 | B2 | 6/2010 | Strom et al. |
| 8,102,402 | B2 | 1/2012 | Sorgard |
| 8,289,343 | B2 | 10/2012 | Sorgard |
| 2003/0123740 | A1 | 7/2003 | Mukherjee |
| 2003/0227462 | A1 | 12/2003 | Akenine-Moller |
| 2008/0002896 | A1* | 1/2008 | Lu et al. .................. 382/232 |
| 2008/0055331 | A1* | 3/2008 | Iourcha et al. ............ 345/582 |
| 2009/0160857 | A1* | 6/2009 | Rasmusson et al. ....... 345/422 |
| 2009/0185747 | A1* | 7/2009 | Segall et al. .............. 382/220 |
| 2011/0148896 | A1 | 6/2011 | Lee |
| 2012/0281005 | A1 | 11/2012 | Nystad |
| 2012/0281006 | A1 | 11/2012 | Nystad |
| 2012/0281007 | A1 | 11/2012 | Nystad |
| 2012/0281925 | A1* | 11/2012 | Nystad et al. ............. 382/232 |
| 2013/0084018 | A1* | 4/2013 | Nystad ..................... 382/232 |
| 2014/0168362 | A1* | 6/2014 | Hannuksela et al. ....... 348/43 |

FOREIGN PATENT DOCUMENTS

| | | |
|---|---|---|
| GB | 1517383 | 8/1975 |
| GB | 2423906 | 9/2006 |
| GB | 2439481 | 12/2007 |
| WO | WO9713219 A1 | 4/1997 |
| WO | WO9922519 | 5/1999 |
| WO | WO2009/133860 | 4/2009 |

OTHER PUBLICATIONS

Office Action dated Sep. 18, 2014 in U.S. Appl. No. 13/464,696, 24 pages.
Office Action dated Oct. 9, 2014 in U.S. Appl. No. 13/933,604, 19 pages.
Office Action dated Aug. 20, 2014 in U.S. Appl. No. 13/464,663, 24 pages.
Search and Examination Report dated Jul. 4, 2014 in GB Patent Application No. GB1401504.4, 8 pages.
Communications, Radar and Signal Processing; vol. 131, Issue 5; Aug. 1984; D. E. Pearson et al; Transform coding of images using interleaved blocks; pp. 466-472; 7 pages.
Response to Office Action (Restriction) filed Jun. 30, 2014 in U.S. Appl. No. 13/464,663, 13 pages.
Response to Office Action (Restriction) filed Jul. 14, 2014 in U.S. Appl. No. 13/464,686, 12 pages.
Response to Office Action (Restriction) filed Jul. 14, 2014 in U.S. Appl. No. 13/464,696, 17 pages.
Combined Search and Examination Report, dated Sep. 27, 2012, GB Patent Application No. GB1208056.0.
Combined Search and Examination Report, dated Oct. 9, 2012, GB Patent Application No. GB1208058.6.
Combined Search and Examination Report, dated Oct. 9, 2012, GB Patent Application No. GB1208059.4.
Combined Search and Examination Report, dated Oct. 8, 2012, GB Patent Application No. GB1208060.2.
BC6H Format, 2011 Microsoft, http://msdn.microsoft.com/en-us/library/hh308952(d=printer).aspx.
BC7H Format, 2011 Microsoft, http://msdn.microsoft.com/en-us/library/hh308953(d=printer).aspx.
Block Truncation Coding, Wikipedia, Aug. 2013, http://en.wikipedia_org/wiki/Block_Truncation_Coding.
Fenney, "Texture Compression using Low-Frequency Signal Modulation," Graphics Hardware 2003, Imagination Technologies Ltc., UK, The Eurographics Association 2003.
PVRTC, Wikipedia, Mar. 2012, http://en.wikipedia.org/wiki/PVRTC.
S3 Texture Compression, Wikipedia, Nov. 2013, http://en.wikipedia.org/wiki/S3_Texture_Compression.
Strom, "iPackman: High-Quality, Low-Complexity Texture Compression for Mobile Phones," Lund University, Graphics Hardware 2005, The Eurographics Association.
Office Action dated Apr. 30, 2014 in U.S. Appl. No. 13/464,663, 6 pages.
Office Action (Restriction) dated May 13, 2014 in U.S. Appl. No. 13/464,686, 6 pages.
Office Action (Restriction) dated May 13, 2014 in U.S. Appl. No. 13/464,696, 6 pages.
New U.S. Appl. No. 14/704,962, filed May 5, 2015, 155 pages.
New U.S. Appl. No. 14/691,572, filed Apr. 20, 2015, 114 pages.
Response to Office Action (Restriction Requirement) filed May 22, 2015 in U.S. Appl. No. 13/464,676, 7 pages.
Response to Office Action filed Nov. 20, 2014 in U.S. Appl. No. 13/464,663, 9 pages.
Response to Office Action filed Jan. 20, 2015 in U.S. Appl. No. 13/464,696, 15 pages.
Notice of Allowance dated Jan. 20, 2015 in U.S. Appl. No. 13/464,663, 16 pages.
Notice of Allowance dated Feb. 6, 2015 in U.S. Appl. No. 13/464,696, 22 pages.
Response to Office Action filed Feb. 18, 2015 in U.S. Appl. No. 13/464,686, 17 pages.
Restriction dated Mar. 27, 2015 in U.S. Appl. No. 13/464,676, 6 pages.
Final Office Action dated Apr. 9, 2015 in U.S. Appl. No. 13/464,686, 25 pages.
Examination Report dated Aug. 4, 2015, in Great Britain Patent Application No. GB1401504.4, 3 pages.
Search Report dated Aug. 4, 2015, in Great Britain Patent Application No. GB1401504.4, 3 pages.

* cited by examiner

METHODS OF AND APPARATUS FOR ENCODING AND DECODING DATA

BACKGROUND

The technology described herein relates to methods of and apparatus for encoding and decoding data, and in particular to such methods and apparatus for use when compressing and decompressing texture data for use in computer graphics systems.

It is common in computer graphics systems to generate colours for sampling positions in an image to be displayed by applying so-called textures or texture data to the surfaces to be drawn. For example, surface detail on objects may be generated by applying a predefined "texture" to a set of graphics primitives (such as polygons) representing the object, to give the rendered image of the object the appearance of the "texture". Such textures are typically applied by storing an array of texture elements or "texels", each representing given texture data (such as colour, luminance, and/or light/shadow, etc., values) at a given location (position), and then mapping the texels onto the corresponding elements, such as (and, indeed, typically) a set of sampling positions, for the image to be displayed. The stored arrays of texture elements (data) are typically referred to as "texture maps".

Such arrangements can provide relatively high image quality, but have a number of drawbacks. In particular, the storage of the texture data and accessing it in use can place, e.g., high storage and processing requirements on a graphics processing device (or conversely lead to a loss in performance where such requirements are not met). This is particularly significant for lower power, mobile, and handheld, devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a graphics processing device when using textures.

Texture compression techniques typically determine a reduced set or palette of colours (or other data) to be used for, e.g., a given texture map, and then store for each texture element (texel) in the texture map an index into the set or palette of colours, indicating the colour to be used for the texture element (texel) in question. This has the advantage that only an index, rather than a full, e.g. colour, value needs to be stored for each texel.

It is also common for existing texture compression techniques to use block-based encoding, i.e. arrangements in which the overall array of texture elements (the texture map) to be encoded is divided into an array of small blocks (such as blocks of 4×4 texels), with each such block then being encoded (compressed), and decoded, separately. This can, e.g., help to make the decoding process more efficient, because the decoder, for example, may need to decode only one or a few of the encoded blocks to determine the value of a texel of interest, rather than the entire encoded texture.

One known block-based texture compression technique is so-called block truncation encoding (BTC). In this technique the overall texture array (texture map) is subdivided into smaller blocks, e.g. of 4×4 texels, and a number (typically two) of base or primary colour values are determined for each such block, with each texel in the block being set to one of the base colour values. This saves on the data that has to be stored and accessed, but at a cost of lower image quality.

U.S. Pat. No. 5,047,853 describes an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two bits, to indicate which of the four block "colours" should be used for the texel. This system provides improved image quality over basic block truncation coding, but requires more data per block.

Known block-based texture compression schemes all use rectangular blocks. This is because it is easy to divide a texture map into blocks this way, the blocks will tile (tessellate) straightforwardly, and it facilitates straightforward determination from a texel's coordinates of which block the texel is in and the texel it is within that block (for example, for 4×4 square blocks, dividing the texel's x and y coordinates by 4 identifies the block, and the remainder in x and y identifies the texel). Such straightforward identification of the block a texel is in, and the texel it is within the block, facilitates random access into the stored texture data (texture map). This is important in texture compression schemes, because, as is known in the art, the decoder will access the stored and compressed texture data (texture map) in a random access fashion, and so storing the compressed texture data (texture map) in a form that facilitates efficient random access into it is important and advantageous.

Although using rectangular blocks for block-based texture compression schemes has a number of benefits, it can lead to certain encoding artefacts in the decompressed (decoded) image. This is because the approximations made when encoding adjacent blocks can lead to mismatches at the block edges. Although these errors may in themselves be small, because all the block edges line up, they can result in linear features that are noticeable in the decoded image.

It is known therefore to try to reduce the effect and/or possibility of such block "edge" artefacts arising. For example, the encoding process may be tuned to reduce block edge artefacts. However, this is usually at the expense of detail in the interior of each block. Some decoding processes interpolate data from adjacent blocks to decode a given texel, thereby, in effect, "blending" adjacent blocks. This can help to reduce block edge mismatches, but is relatively expensive as it can, e.g., require reads from up to four encoded blocks to decode one texel. It is also known to apply some form of filtering to the decoded image to try to reduce the effect of block edge artefacts, but this requires post-processing of the decoded image, which is not always desirable or possible.

The Applicants believe therefore that there remains scope for improved block-based texture compression schemes that are to be used for encoding texture data for use in graphics processing.

BRIEF DESCRIPTION OF THE DRAWINGS

A number of embodiments of the technology described herein will now be described by way of example only and with reference to the accompanying drawings, in which:

FIG. 2 shows schematically a sub-set of texture data elements that can be encoded as an encoded texture data block.

FIG. 3 shows schematically a sub-set of texture data elements that is encoded as an encoded texture data block in the described embodiment of the technology described herein;

FIGS. 4 and 5 show schematically the arrangement for generating the texture data array layouts that are encoded in the described embodiment of the technology described herein;

Like numerals are used for like features in the drawings (where appropriate).

DETAILED DESCRIPTION

Figure 1:
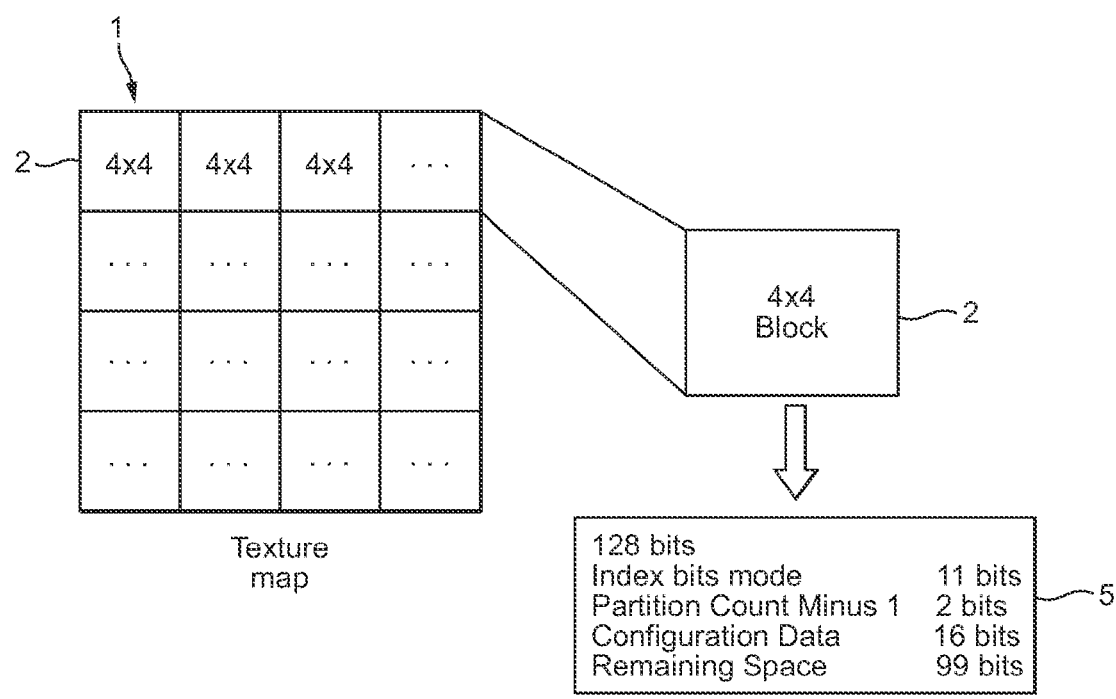
FIG. 1 shows schematically the encoding of an array of image data as a plurality of encoded data blocks.

A first embodiment of the technology described herein comprises a method of encoding an array of texture data elements to be used in a graphics processing system, the method comprising:
encoding the array of texture data elements as a plurality of encoded texture data blocks, each encoded texture data block representing a sub-set of the texture data elements of the array of texture data elements to be encoded and containing data to allow decoded data values for the sub-set of the texture data elements that the block represents to be determined; and wherein:
at least one of the encoded texture data blocks represents a non-rectangular sub-set of texture data elements from the array of texture data elements to be encoded.

A second embodiment of the technology described herein comprises an apparatus for encoding an array of texture data elements to be used in a graphics processing system, the apparatus comprising:
processing circuitry configured to encode the array of texture data elements as a plurality of encoded texture data blocks, each encoded texture data block representing a sub-set of the texture data elements of the array of texture data elements to be encoded and containing data to allow decoded data values for the sub-set of the texture data elements that the block represents to be determined; and wherein:
at least one of the encoded texture data blocks represents a non-rectangular sub-set of texture data elements from the array of texture data elements to be encoded.

The technology described herein in these embodiments relates to a block-based texture encoding (compression) scheme, i.e. an encoding scheme in which the array of texture data elements (the texture map) to be encoded is divided into a plurality of smaller blocks (sub-sets) of texture data elements (texels) for encoding purposes. However, rather than each encoded texture data block representing a rectangular sub-set (block) of texture data elements from the original texture, in the technology described herein at least one of the encoded texture data blocks represents a non-rectangular sub-set (block) of texture data elements from the original texture.

The Applicants have found that encoding texture data blocks that represent non-rectangular sub-sets of texture data elements (texels) from the original texture can avoid or reduce the linear artefacts that would be generated if each encoded texture data block represented a rectangular block of texels from the original texture (as is the case in known and conventional block-based encoding schemes). This then avoids or reduces the need, for example, for additional processing to try to avoid or compensate for block edge artefacts at the decoder, and the need to compromise on the quality of the encoding process to try to avoid such artefacts in the first place.

Moreover, the Applicants have found that it is possible to encode non-rectangular blocks of texels from the original texture, yet still provide an encoded texture that can be relatively efficiently decoded and into which random access to texel values is relatively straightforward. Indeed, as will be discussed further below, the Applicants have found that textures encoded in the manner of the technology described herein can be accessed and decoded essentially as efficiently as in conventional block-based encoding schemes that encode rectangular blocks of texels from the original texture.

While it would be possible for only some but not all of the encoded texture data blocks that are used to represent the texture to represent non-rectangular sub-sets of texture data elements from the original texture, in an embodiment, all of the encoded texture data blocks that are used to represent the texture represent (respective) non-rectangular sub-sets of texture data elements from the original texture (i.e. each encoded texture data block representing the texture represents a non-rectangular sub-set of texture data elements from the array of texture data elements to be encoded).

Thus, in an embodiment, the technology described herein comprises dividing the texture to be encoded into a plurality of non-rectangular sub-sets of texture data elements, and then encoding the non-rectangular sub-sets of texture data elements that the texture has been divided into to provide a set of encoded texture data blocks representing the texture.

Similarly another embodiment of the technology described herein comprises a method of encoding an array of texture data elements to be used in a graphics processing system, the method comprising:
dividing the array of texture data elements into a plurality of non-rectangular sub-sets of texture data elements; and
encoding the non-rectangular sub-sets of texture data elements that the texture has been divided into to provide a set of encoded texture data blocks representing the texture.

An embodiment of the technology described herein comprises an apparatus for encoding an array of texture data elements to be used in a graphics processing system, the apparatus comprising:
processing circuitry configured to:
divide the array of texture data elements into a plurality of non-rectangular sub-sets of texture data elements; and
encode the non-rectangular sub-sets of texture data elements that the texture data array has been divided into to provide a set of encoded texture data blocks representing the array of texture data elements.

The non-rectangular sub-sets of texture data elements from the original texture that the encoded texture data blocks can represent in the technology described herein can take any suitable and desired form, and can be any desired and suitable configuration, size and (non-rectangular) shape.

In an embodiment, the original texture (the texture map) being encoded is divided into sub-sets of equal size, i.e. each encoded block represents the same number of texture data elements. This can, e.g., simplify the task of finding which block a given texture data element lies in. In an embodiment, each encoded block, for a 2D texture, represents a square number of texels, such as, and in an embodiment 16, 25, 36, 64, 100, or 144 texels (and for a 3D texture, a cube number of texels, such as 27, 64, 125, or 216 texels).

The non-rectangular sub-sets of texture data elements from the original texture that the encoded texture data blocks can represent in the technology described herein (i.e. the non-rectangular sub-sets of texels that the texture is divided into for encoding purposes) could all have the same shape (layout or arrangement). However, this is not essential, and, indeed, the Applicants have found that the scheme of the technology described herein can work better where the non-rectangular sub-sets can have (and have) different shapes (configurations). The different sub-set shapes should be complementary, i.e., match appropriately at and along their adjoining (abutting) edges, so that the non-rectangular sub-sets will tile (tesselate) across the texture.

Thus, in an embodiment, the non-rectangular sub-sets of texture data elements from the original texture that the encoded texture data blocks can represent in the technology described herein can have different, in an embodiment complementary, shapes (i.e. the texture is divided non-rectangular sub-sets of texels having different, in an embodiment complementary, shapes for encoding purposes). Thus each "non-rectangular" encoded texture data block representing the texture in an embodiment represents one of a set of plural different, in an embodiment complementary, non-rectangular texture data element sub-set shapes (that are being used for the texture). In an embodiment the different non-rectangular texture data element sub-set shapes that are being used for the texture interlock along respective edges of the sub-set shapes.

In an embodiment each encoded texture data block of a respective pair of encoded texture data blocks representing adjacent (abutting) sub-sets of texture data elements in the texture being encoded represent respective different, but in an embodiment complementary, shaped non-rectangular sub-sets of texture data elements from the original texture. In an embodiment two different non-rectangular block sub-set shapes (configurations) are used, arranged in a chequerboard pattern across the texture. Other arrangements, such as the use of a single repeating shape, two shapes in rows or columns, four rotationally symmetric shapes in 2×2 blocks, etc., or even completely aperiodic tilings (like a jigsaw), could also be used, if desired.

The non-rectangular sub-sets of texture data elements that the texture is divided into for encoding purposes as well as being non-rectangular, in an embodiment also do not have straight edges. In an embodiment, the edges of the sub-sets are crinkly, stepped or crenellated in some way so that they are not straight (from corner to corner of the sub-set).

The Applicants have further recognised that there are certain factors that it is desirable to take into account when selecting the configuration of the non-rectangular sub-sets of texture data elements to be used, and, furthermore, that as a consequence of this, certain configurations and/or properties may be advantageous for the non-rectangular sub-sets of texture data elements that the encoded texture data blocks represent.

For example, in an embodiment the non-rectangular sub-sets that the texture is divided into for encoding purposes tile (tessellate) efficiently within the texture. This makes dividing the texture into separate sub-sets (blocks) for encoding purposes more straightforward.

Equally, texture encoding (compression) schemes typically exploit, and rely on, the fact that texture data elements that are close to each other in the original texture will tend to have similar values, i.e. there will be spatial coherence between the texel values in the texture to be encoded. The Applicants have recognised therefore that it is desirable for the non-rectangular sub-sets of texels that are used in the technology described herein to not contain texels that are spaced too far apart in the original texture, so as to try to still maintain at least some spatial coherence between the texture data elements in the non-rectangular sub-sets (blocks) of texture data elements that are being encoded. In an embodiment the texels in a given non-rectangular sub-set are not more than half a block width apart.

These features can be and are in an embodiment achieved by configuring the non-rectangular sub-sets of texture data elements to still be generally rectangular in shape, but with displaced edges (edges that are not straight lines) (to give a non-rectangular shape). Thus, in an embodiment, the non-rectangular sub-sets of texture data elements are in an embodiment in the form of rectangles (including, and in an embodiment, squares), the edges of which have been modified so that they are not straight lines and in an embodiment the edges of which have been modified so that they interlock with the edges of adjacent sub-sets (blocks) of texture data elements in the texture.

In these arrangements, the generally rectangular sub-sets of texture data elements that are encoded as texture data blocks are in an embodiment configured such that they include, at certain points along what would be their "normal", rectangular edges, texels that are displaced outwardly from what would be the "normal" edge of the rectangular sub-set. This will then provide a generally rectangular sub-set, but with non-straight edges, and so a non-rectangular shape for the sub-set to be encoded for the encoded texture data block in question.

In an embodiment, where a texel that is displaced outwardly from what would be the normal edge of the rectangular sub-set is included in the sub-set, a corresponding texel, such as, and in an embodiment, a corresponding edge texel that would be in the "normal" rectangular sub-set is omitted from the sub-set (block) that is to be encoded. This then allows the total number of texels in the sub-set that is to be encoded to be the same as the number of texels that there would be if the "normal" rectangular sub-set of texels was to be used. This can be advantageous for the encoding (and decoding) process.

In these arrangements, and as discussed above, in an embodiment texels that are not spaced outwardly too far from the "normal" edge of the base rectangular sub-set are included in the non-rectangular sub-set (block) of texels that is encoded. In an embodiment only texels that are a small distance from the normal edge, such as one or two positions outward of the normal edge are included in the non-rectangular sub-set to be encoded (and, correspondingly, only texels that are at the edge or one position inside the edge, are correspondingly omitted from the non-rectangular sub-set to be encoded).

In one embodiment, only texels that are one texel position outside the "normal" edge are added to (and, in an embodiment, texels that are on the edge are correspondingly omitted from) the base rectangular (e.g. square) sub-set of texels to form the non-rectangular sub-set of texels that is then encoded.

In another embodiment, only texels that are two texel positions outside the "normal" edge are added to (and, in an embodiment, texels that are one position inside the edge are correspondingly omitted from) the base rectangular (e.g. square) sub-set of texels to form the non-rectangular sub-set of texels that is then encoded. This may be instead of, or as well as, texels that are one texel position outside the "normal" edge being added to (and, in an embodiment, texels that are on the edge correspondingly being omitted from) the base rectangular (e.g. square) sub-set of texels to form the non-rectangular sub-set of texels that is then encoded.

Including further spaced texels in the non-rectangular sub-set (block) of texels to be encoded (and correspondingly omitting "deeper" texels within the "base" rectangular subset (block)), may be beneficial when encoding larger texel sub-set (block) sizes.

In these arrangements, the outwardly spaced texels that are included in the non-rectangular sub-set (block) of texels to be encoded can be selected as desired. An outwardly lying texel should not be included at every position along the edge of the "base" rectangular sub-set, so in an embodiment an outwardly lying texel is included in the sub-set (and, in an embodiment, a corresponding texel omitted from the "base" rectangular sub-set) at some but not all of the positions along the edge of the "base" rectangular sub-set.

The position(s) along the edges at which an outwardly lying texel is included in the sub-set could be selected, for example, in a pseudo-random fashion.

However, in an embodiment, a predetermined selection pattern (mapping) is used to determine (select) at which edge positions an outwardly-spaced texel is included in the sub-set to be encoded (and a corresponding texel is omitted from the "base" rectangular sub-set). This selection pattern in an embodiment divides the edge positions into groups of a fixed number of edge positions (such as 2, 3 or 4 edge positions), and then includes at least one (and in an embodiment one and only one) outwardly-spaced texel in the sub-set to be encoded (and omits a corresponding texel or texels from the "base" rectangular sub-set) at particular positions within the group of edge positions.

The size of the group of edge positions will accordingly in effect define the frequency around the edge of the "base" rectangular sub-set of texels at which the edge of the "base" rectangular sub-set of texels is distorted from being a straight edge (and thus can be looked on as a "period" value). The particular position(s) within the group of edge positions can correspondingly be thought of as a "phase" value. In effect therefore, this arrangement will divide the edge positions around the "base" rectangular sub-set into groups or sets, with at least one particular position in each group or set then being, in effect, displaced away from the normal straight edge, to thereby give a non-rectangular sub-set of texels to be encoded.

In an embodiment the arrangement is such that at least one texel position on each edge of the "base" rectangular sub-set of texels is "displaced". In an embodiment every other texel position on the edges of the "base" rectangular sub-set of texels is "displaced". The Applicants have found that this can be particularly effective at reducing or avoiding the effects of block edge artefacts in a decoded texture.

In these arrangements, the size of the groups (sets) of edge positions (the "period") is in an embodiment a power of two (as this then facilitates implementing the process in hardware). In one embodiment, each group (set) of edge positions contains two edge positions (i.e. the "period" is 2). This then means that every other edge position is, in effect, displaced away from the straight-edge of the base rectangular sub-set of texels. The Applicants have found that this can be particularly effective at reducing block edge artefacts. In this case, the Applicants have found that for even-sized base rectangular texel sub-sets, it does not matter which edge position of the pair of edge positions in each group (set) is "displaced" (i.e. the "phase" can be "0" or "1"). However, for odd-sized base rectangular texel sub-sets, in an embodiment the edge positions that do not lie exactly at the corners of the base-rectangular sub-set shape are "displaced", i.e. the "phase" is "1", as this tends to "round off" the decoded block corners.

In an embodiment a predetermined position selection function, in which the "period" and "phase", as discussed above, can be set is used to determine which edge positions to "displace".

In an embodiment this edge position selection function comprises numbering the texel positions clockwise along each edge of the "base" rectangular sub-set of texels, starting from zero, then dividing this number by the specified "period" value and comparing the remainder with the specified "phase" value. If the period is a power of two, this can be achieved by comparing the number of lowest bits corresponding to the power in the power of two period (so the lowest bit if the period is 2 (2^1), the lowest two bits if the period is 4 (2^2), and so on) of the number of edge positions with the phase (and so is easy to implement in hardware).

Although the technology described herein uses encoded texture data blocks that represent non-rectangular blocks (sub-sets) of texture data elements from the original texture to be encoded, as noted above, in an embodiment the non-rectangular blocks of texels that are encoded still contain the number of texels that would be present in a rectangular, and in an embodiment that would be present in a square (or cube, for a 3D block), block (array) of texels, such as 16, 25 or 36, etc. texels. This has the advantage then that the non-rectangular blocks of texels that are encoded in the technology described herein can still be encoded using existing and conventional block encoding schemes (i.e. that are designed to encode rectangular arrays of texels), without the need for modification to those schemes (as the input to the block encoding process can still effectively be a rectangular block of texture data elements (albeit containing texels from a non-rectangular sub-set of texels in the original texture) of a given size).

This then means that the technology described herein can be used with and applied to existing block encoding schemes transparently, simply by modifying the block of texels that is input to the existing encoding scheme (and conversely that the technology described herein can be used with any desired block encoding scheme that can operate on rectangular blocks of texels). Indeed, it is a significant advantage of the technology described herein that the encoding of the texel blocks themselves can be done in a conventional manner (if desired) and that it can be used with any desired and suitable block-based encoding (compression) scheme.

The texture to be encoded in the manner of the technology described herein can be divided and organised into non-rectangular blocks of texture data elements for encoding purposes in any suitable and desired manner.

In an embodiment, this is achieved by encoding the texture as if it has been divided into a set of rectangular (and in an embodiment square) (for a 2D texture) blocks (sub-sets of texels), but then for each respective rectangular block, one or more of the texels in the block have been replaced with a corresponding number of texels from another rectangular block or blocks from the texture.

Thus in an embodiment, the non-rectangular sub-sets of texture data elements that are encoded in the technology described herein are configured such that the array of texture data elements to be encoded has effectively been divided into a plurality of smaller rectangular blocks of texture data elements, but then, for at least one (and in an embodiment for all) of the rectangular blocks of texture data elements, at least one texture data element of the block has been replaced with a texture data element from another one of the rectangular blocks of texture data elements, such that the (or each) block that is encoded effectively then contains at least one texture data element from what would be another rectangular block of texture data elements from the array of texture data in the place of a texture data element that was originally in the block.

Similarly, another embodiment of the technology described herein comprises a method of encoding an array of texture data elements to be used in a graphics processing system, the method comprising:

dividing the array of texture data elements into a plurality of non-rectangular sub-sets of texture data elements that are configured such that the array of texture data elements has effectively been divided into a plurality of smaller rectangular sub-sets of texture data elements, and then, for at least one (and in an embodiment for all) of the rectangular sub-set of texture data elements, at least one texture data element of the sub-set has been replaced with a texture data element from another one of the rectangular sub-sets of texture data elements, such that the (or each) sub-set effectively then contains at least one texture data element from what would be another rectangular sub-set of texture data elements from the array of texture data in the place of a texture data element that was originally in the sub-set; and encoding the non-rectangular sub-sets of texture data elements that the texture has been divided into to provide a set of encoded texture data blocks representing the texture.

An embodiment of the technology described herein comprises an apparatus for encoding an array of texture data elements to be used in a graphics processing system, the apparatus comprising:

processing circuitry configured to:

divide the array of texture data elements into a plurality of non-rectangular sub-sets of texture data elements that are configured such that the array of texture data elements has effectively been divided into a plurality of smaller rectangular sub-sets of texture data elements, and then, for at least one (and in an embodiment for all) of the rectangular sub-sets of texture data elements, at least one texture data element of the sub-set has been replaced with a texture data element from another one of the rectangular sub-sets of texture data elements, such that the (or each) sub-set effectively then contains at least one texture data element from what would be another rectangular sub-set of texture data elements from the array of texture data in the place of a texture data element that was originally in the sub-set; and encode the non-rectangular sub-sets of texture data elements that the texture has been divided into to provide a set of encoded texture data blocks representing the texture.

These arrangements, as in conventional block-based encoding schemes, effectively divide the texture data array to be encoded into rectangular blocks (sub-sets) of texels. However, in contrast to known schemes, a texel (or texels) in a given block is or are replaced with a texel (or texels) from another block or blocks.

Effectively replacing some of the texels in a rectangular block (sub-set) of texels with texels from another block or blocks (sub-set) means that the block of texels then corresponds to (and represents) a non-rectangular sub-set of texels from the original texture (as replacing a texture data element in one rectangular block with a texture data element from another rectangular block before encoding the block causes the edge(s) of the original rectangular block (and thus of the block when encoded) to be, in effect, scrambled, such that the block (sub-set) that is encoded is then no longer, in effect, rectangular (no longer, in effect, has straight and perpendicular edges)).

Moreover, because this is achieved by notionally replacing texture data elements in rectangular blocks (sub-sets) before encoding the blocks, it means that even though the encoded blocks are, in effect, non-rectangular, the encoding process can still operate on effectively rectangular blocks, such that existing block encoding schemes can still be (and are in an embodiment) used to encode the blocks, without the need for modification to those schemes (as the input to the block encoding process can still be a rectangular block (sub-set) of texture data elements of a given size).

These embodiments of the technology described herein can, and in an embodiment do, include any one or more or all of the optional features of the technology described herein described herein.

Thus, for example, the one or more texels in each notional rectangular block (sub-set) of texels that are replaced with texels from another block or blocks, are in an embodiment replaced with texels from notional rectangular blocks of texels that are adjacent to the block in question. Similarly, it is in an embodiment texels along the edges (and in an embodiment at regular intervals along the edges) of the block, such as, and in an embodiment, every other edge texel, that are replaced (and those texels are correspondingly in an embodiment replaced with corresponding texels from (along) the adjoining edge of the respective adjacent texel block).

The arrangement is in an embodiment such that the total number of texels in each block remains the same as the number of texels that would be in the (and in an embodiment each) rectangular block that the texture is effectively initially divided into. This will then allow the blocks to be encoded using conventional block-based encoding schemes and ensure that the entire texture can be reconstructed from the encoded blocks.

Although it would be possible to configure the process such that only some but not all of the rectangular blocks of texels that the texture is notionally divided into have texels replaced with texels from other blocks, in an embodiment this is done for each of the rectangular blocks of texels that the texture is notionally divided into.

The configuration of the blocks such that the texels in one rectangular block are replaced with texels from another block or blocks can be carried out in any desired and suitable manner. However, in an embodiment, this is achieved by configuring the blocks that are encoded as if texels have been swapped between respective, and in an embodiment adjacent, pairs of blocks in the array of rectangular blocks that the texture is notionally divided into.

Thus, in an embodiment, the texture data array (texture map) is encoded by encoding it as if it has been initially divided into rectangular blocks (sub-sets) of texture data elements (texels), but before the blocks are encoded, some texture data elements have been swapped (exchanged) between (in an embodiment adjacent) blocks (i.e. at least a texel (or texels) from one block has been swapped with a texel (or texels) from another, in an embodiment adjacent, block).

Thus in an embodiment, the non-rectangular sub-sets of texture data elements that are encoded in the technology described herein are configured such that the array of texture data elements to be encoded has effectively been divided into a plurality of smaller rectangular blocks (sub-sets) of texture data elements, but then, for at least one, in an embodiment adjacent, pair (and in an embodiment for all, in an embodiment adjacent, pairs) of the rectangular blocks of texture data elements, at least one pair of texture data elements has been swapped between the blocks (sub-sets), such that when the blocks are encoded, each block of the pair of blocks then contains at least one texture data element from the other block of the pair of blocks in the place of a texture data element that was originally in the block.

Similarly, another embodiment of the technology described herein comprises a method of encoding an array of texture data elements to be used in a graphics processing system, the method comprising:
dividing the array of texture data elements into a plurality of non-rectangular sub-sets of texture data elements that are configured such that the array of texture data elements has effectively been divided into a plurality of smaller rectangular sub-sets of texture data elements, and then, for at least one pair of the rectangular sub-sets of texture data elements, at least one pair of texture data elements has been swapped between the sub-sets, such that when the sub-sets are encoded, each sub-set of the pair of sub-sets then contains at least one texture data element from the other sub-sets of the pair of sub-sets in the place of a texture data element that was originally in the sub-set; and
encoding the non-rectangular sub-sets of texture data elements that the texture has been divided into to provide a set of encoded texture data blocks representing the texture.

Another embodiment of the technology described herein comprises an apparatus for encoding an array of texture data elements to be used in a graphics processing system, the apparatus comprising:
processing circuitry configured to:
divide the array of texture data elements into a plurality of non-rectangular sub-sets of texture data elements that are configured such that the array of texture data elements has effectively been divided into a plurality of smaller rectangular sub-sets of texture data elements, and then for at least one pair of the rectangular sub-sets of texture data elements at least one pair of texture data elements has been swapped between the sub-sets, such that when the sub-sets are encoded, each sub-set of the pair of sub-sets then contains at least one texture data element from the other sub-set of the pair of sub-sets in the place of a texture data element that was originally in the sub-set; and
encode the non-rectangular sub-sets of texture data elements that the texture has been divided into to provide a set of encoded texture data blocks representing the texture.

Again, these embodiments of the technology described herein can, and in an embodiment do, include one or more or all of the features of the technology described herein described herein.

For example, the pair or pairs of rectangular blocks (sub-sets) that the texture data elements are swapped between in an embodiment each comprise respective pairs of adjacent rectangular blocks (sub-sets) of texture data elements that the array of texture data has notionally been divided into. In an embodiment at least one pair of texture data elements is swapped for each respective pair of adjacent rectangular blocks of texture data elements that the original array of texture data is notionally divided into.

In an embodiment the texture data elements are replaced or swapped between blocks (sub-sets) in such a way that the texture data elements are displaced from their initial block (sub-set) in a direction that is parallel to an edge of the initial rectangular block (sub-set) in question.

Encoding the texture as if texture data elements have been swapped between rectangular blocks (sub-sets) is a relatively straightforward mechanism for causing the edges of blocks (and of the blocks that are encoded) to be, in effect, scrambled or distorted, such that the blocks that are encoded then no longer represent rectangular sub-sets of texels (i.e. no longer, in effect, have straight and perpendicular edges).

Furthermore, effectively swapping texture data elements between initially notionally rectangular blocks before encoding the blocks, means that even though the encoded blocks represent non-rectangular sub-sets (blocks) of texels from the original texture, the encoding process can still operate on rectangular blocks (such that existing block encoding schemes can still be (and are in an embodiment) used to encode the blocks). This then means that the non-rectangular sub-sets of texture data elements can be encoded using existing and conventional block encoding schemes, without the need for modification to those schemes (as the input to the block encoding process can still affectively be a rectangular block of texture data elements of a given size).

Also, because the texture data elements are swapped between notionally initially rectangular blocks, the blocks will still tile (tessellate) to form the overall texture data element array (texture map), without the need for any additional processing to be able to achieve that.

The encoding of the texture as if it has been divided into a set of rectangular blocks, and then texture data elements replaced/swapped in and between the blocks can be achieved in any suitable and desired manner.

In one embodiment, this is achieved by the encoding process and encoder first dividing the texture into a set of rectangular (and in an embodiment square) (for a 2D texture) blocks (sub-sets of texels), and then for each respective rectangular block, replacing one or more of the texels in the block with a corresponding number of texels from another one or ones of the blocks that the texture has been divided into.

Thus in an embodiment, the encoding process and encoder of the technology described herein divide the array of texture data elements to be encoded into a plurality of smaller rectangular blocks of texture data elements, and then, for at least one (and in an embodiment for all) of the rectangular blocks of texture data elements that the array of texture data has been divided into, replacing at least one texture data element of the block with a texture data element from another one of the rectangular blocks of texture data elements that the array of texture data has been divided into, such that the (or each) block then contains at least one texture data element from another block of the rectangular blocks of texture data elements that the array of texture data has been divided into in the place of a texture data element that was originally in the block (which so configured blocks are then encoded).

Similarly, another embodiment of the technology described herein comprises a method of encoding an array of texture data elements to be used in a graphics processing system, the method comprising:
dividing the array of texture data elements into a plurality of smaller rectangular blocks of texture data elements; and
then, for at least one (and in an embodiment for all) of the rectangular blocks of texture data elements that the array of texture data has been divided into, replacing at least one texture data element of the block with a texture data element from another one of the rectangular blocks of texture data elements that the array of texture data has been divided into, such that the (or each) block then contains at least one texture data element from another block of the rectangular blocks of texture data elements that the array of texture data has been divided into in the place of a texture data element that was originally in the block; and encoding the non-rectangular sub-sets of texture data elements that the texture has been divided into to provide a set of encoded texture data blocks representing the texture.

An embodiment of the technology described herein comprises an apparatus for encoding an array of texture data elements to be used in a graphics processing system, the apparatus comprising:

processing circuitry configured to:

divide the array of texture data elements into a plurality of smaller rectangular blocks of texture data elements;

for at least one (and in an embodiment for all) of the rectangular blocks of texture data elements that the array of texture data has been divided into, replace at least one texture data element of the block with a texture data element from another one of the rectangular blocks of texture data elements that the array of texture data has been divided into, such that the (or each) block then contains at least one texture data element from another block of the rectangular blocks of texture data elements that the array of texture data has been divided into in the place of a texture data element that was originally in the block; and encode the non-rectangular sub-sets of texture data elements that the texture has been divided into to provide a set of encoded texture data blocks representing the texture.

These embodiments of the technology described herein can, and in an embodiment do, include any one or more or all of the optional features of the technology described herein described herein.

Thus, for example, the one or more texels in each initial rectangular block of texels that are replaced with texels from another block or blocks, are in an embodiment replaced with texels from initial rectangular blocks of texels that are adjacent to the block in question. Similarly, it is in an embodiment texels along the edges (and in an embodiment at regular intervals along the edges) of the block, such as, and in an embodiment, every other edge texel, that are replaced (and those texels are correspondingly in an embodiment replaced with corresponding texels from (along) the adjoining edge of the respective adjacent texel block).

The replacing of the texels should be and is in an embodiment such that the total number of texels in each block remains the same as the number of texels that were in the (and in an embodiment each) rectangular block that the texture was initially divided into. This will then allow the blocks to be encoded using conventional block-based encoding schemes and ensure that the entire texture can be reconstructed from the encoded blocks.

Although it would be possible to replace the texels in only some but not all of the initial rectangular blocks of texels that the texture is divided into with texels from other blocks, in an embodiment this is done for each of the initial rectangular blocks of texels that the texture is divided into.

Similarly, in an embodiment of these arrangements of the technology described herein, the replacement of texels in one initial rectangular block with texels from another block or blocks is achieved by swapping texels between respective, and in an embodiment adjacent, pairs of blocks in the array of rectangular blocks that the texture is initially divided into.

Thus, in one embodiment, the texture data array (texture map) to be encoded is initially divided into rectangular blocks of texture data elements (texels), but before the blocks are encoded, some texture data elements are swapped (exchanged) between (in an embodiment adjacent) blocks (i.e. at least a texel (or texels) from one block is swapped with a texel (or texels) from another, in an embodiment adjacent, block).

Thus in an embodiment, the non-rectangular sub-sets of texture data elements that are encoded in the technology described herein are generated by dividing the array of texture data elements to be encoded into a plurality of smaller rectangular blocks of texture data elements, and then, for at least one pair (and in an embodiment for all pairs) of, in an embodiment adjacent, rectangular blocks of texture data elements that the array of texture data has been divided into, swapping at least one pair of texture data elements between the blocks, such that each block of the pair of blocks then contains at least one texture data element from the other block of the pair of blocks in the place of a texture data element that was originally in the block.

Similarly, another embodiment of the technology described herein comprises a method of encoding an array of texture data elements to be used in a graphics processing system, the method comprising:

dividing the array of texture data elements into a plurality of smaller rectangular blocks of texture data elements;

for at least one pair of rectangular blocks of texture data elements that the array of texture data has been divided into, swapping at least one pair of texture data elements between the blocks, such that each block of the pair of blocks then contains at least one texture data element from the other block of the pair of blocks in the place of a texture data element that was originally in the block; and encoding the non-rectangular sub-sets of texture data elements that the texture has been divided into to provide a set of encoded texture data blocks representing the texture.

Another embodiment of the technology described herein comprises an apparatus for encoding an array of texture data elements to be used in a graphics processing system, the apparatus comprising:

processing circuitry configured to:

divide the array of texture data elements into a plurality of smaller rectangular blocks of texture data elements;

for at least one pair of rectangular blocks of texture data elements that the array of texture data has been divided into, swap at least one pair of texture data elements between the blocks, such that each block of the pair of blocks then contains at least one texture data element from the other block of the pair of blocks in the place of a texture data element that was originally in the block; and encode the non-rectangular sub-sets of texture data elements that the texture has been divided into to provide a set of encoded texture data blocks representing the texture.

Again, these embodiments of the technology described herein can, and in an embodiment do, include one or more or all of the features of the technology described herein described herein.

For example, the pair or pairs of rectangular blocks that the texture data elements are swapped between in an embodiment each comprise respective pairs of adjacent rectangular blocks of texture data elements that the array of texture data has been divided into. In an embodiment at least one pair of texture data elements is swapped for each respective pair of adjacent rectangular blocks of texture data elements that the original array of texture data is divided into.

In an embodiment the texture data elements are replaced or swapped between blocks in such a way that the texture data elements are displaced from their initial block in a direction that is parallel to an edge of the initial rectangular block in question.

In the above arrangements, the texture data elements will effectively be moved around in the texture before the blocks (sub-sets) of texture data elements are fed to the encoder and the encoding process for encoding.

It would instead be possible for the encoding process simply to load the texture data elements directly from their effectively displaced positions when encoding a given block (sub-set) of texture data elements to be encoded, i.e. for, the addressing of the texture data elements when encoding texture data elements for a particular block to be modified so that the appropriate displaced (e.g. swapped) texture data elements are fetched from their displaced positions in the texture, instead of their original positions, for input to the encoder and encoding process.

Thus, in another embodiment, the encoder and encoding process operate such that the texture data element addressing is modified when fetching the texture data elements for encoding for a given block of texture data elements to be encoded, e.g., and in an embodiment, such that some of the texture data elements that are fetched for encoding for a given block of texture data elements to be encoded are texture data elements that (effectively) lie in an adjacent rectangular block of texture data elements.

The Applicants have further recognised that although, as discussed above, it is advantageous to encode non-rectangular sub-sets of texels (for the reasons discussed above), the outer edges of the texture map should still be retained as straight lines (i.e. the edges of the image need to remain straight in the encoded (and then decoded) texture). The encoding scheme of the technology described herein accordingly in an embodiment achieves this.

In an embodiment this is achieved by the encoding process identifying the edges of the texture map to be encoded, and keeping any block edge that lies along an edge of the texture map as a straight line (e.g. by not replacing or swapping texels along that edge with texels in another block that the texture is to be divided into for encoding purposes). Thus, in an embodiment, the block or texel addressing process is configured to check whether a texel position lies at the edge of the texture to be encoded, and if it does, to leave the texel in its original position, even if it should normally be replaced or swapped with a texel from another block (with a displaced texel).

(It should be noted here that even though the block edges that lie along the edges of the texture map will be retained as straight edges, the blocks themselves can still be, and are in an embodiment, non-rectangular, as there will be other block edges that do not lie along the edge of the texture that can still be configured to be non-straight.)

Once the (non-rectangular) sub-sets of texture data elements to be encoded to represent the texture have been generated, those non-rectangular sub-sets of texture data elements can then be, and are in an embodiment then, encoded to generate a set of encoded texture data blocks representing the texture in question (which set of encoded texture data blocks representing the texture can then, e.g., be stored, etc., for future use, e.g., when the texture is to be applied to an image).

The technology described herein accordingly also extends to, and in an embodiment includes, encoding the non-rectangular sub-set or sub-sets of texture data elements as (respective) blocks of texture data representing the sub-set or sub-sets of texture data elements.

The encoding process can use any suitable and desired encoding scheme. It in an embodiment uses a, in an embodiment known, block-based encoding scheme, such as S3TC, BC6, BC7 or ASTC. (As discussed above it is an advantage of the technology described herein that it can be used with, and use, existing and conventional block-based encoding schemes). In an embodiment, ASTC is used to encode the sub-set(s) of texture data elements.

Thus, the method and apparatus of the technology described herein in an embodiment further comprise a step of encoding, or processing circuitry configured to encode, the (non-rectangular) sub-set of texture data elements, and/or the sub-sets (blocks) of texture data elements that the texture has been divided into, in an embodiment using a block-based encoding scheme, to provide an encoded texture data block representing the sub-set of texture data elements, and/or a set of encoded texture data blocks representing the texture.

Each encoded texture data block should include all the information that is necessary for, and/or expected by, a decoder, to allow the decoder to decode the encoded texture data block to reproduce (at least approximately) the original sub-set of texture data elements that the block represents, such as (at least) data indicating or allowing to be derived a base data (e.g. colour) value or values (such as colour endpoint values) for the encoded texture data block, and information to allow the decoder to determine (at least an approximation to) the value of a given texture data element from the base data value or values (e.g. endpoint colours) for the block. The data that should be included in the encoded texture data block to achieve this will depend upon the exact nature of the texture data encoding (compression) scheme in question. This data can be arranged in any suitable and desired manner in the encoded texture data block (i.e. in practice in the manner that a decoder can recognise and correctly interpret).

The technology described herein can be used to encode any suitable form of texture data. As discussed above, such data, in its original, raw or unencoded form, is typically arranged in the form of arrays of texture elements or texels, and thus in an embodiment, the technology described herein is used to encode an array of texture data elements (texels). Such arrays are typically, as is known in the art, 2-dimensional, although it is also possible to use the technology described herein to encode a 3-dimensional array (and, indeed, it is an advantage of the technology described herein that it can be used to encode 3-dimensional textures in an efficient manner).

The texture to be encoded and the texture data elements can represent any suitable texture data. In one embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc., as is known in the art.

However, the technology described herein can also be used to process and encode (and decode) textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the texture of the technology described herein may represent other forms of data that are to be processed as a texture in a graphics processing system, if desired.

In an embodiment, the texture data elements each represent a colour value for a texture element, but this is not essential. In an embodiment the texture data elements represent: low dynamic range (LDR) texture data with 1, 2, 3 or 4 components per texel (luminance, luminance-alpha, RGB and RGB-alpha, respectively) or high dynamic range (HDR) texture data with 1, 3 or 4 components per texel.

As will be appreciated by those skilled in the art, the actual data values accorded to the texture elements, both in their original, unencoded raw form, and in their encoded form (or at least when the encoded data has been decoded to reproduce a representation of the original data) will depend on the form of "texture" that the texture elements are intended to define or represent.

Thus, for example, where the texture elements define colours to be used, the texture data elements in their original, unencoded form may each comprise a set of colour values (Red, Green, Blue (RGB), a set of colour and transparency values (Red, Green, Blue, Alpha (RGBa)), or a set of luminance and chrominance values, and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate for each texture data block to only encode data necessary to generate some, but not all, of the data values necessary to reproduce the original data, with the remaining data values being derived (e.g. therefrom) as part of the data reproduction process. Thus, in one embodiment, the encoded texture data block encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGBa values as discussed above. Equally, references to generating a set of data values for an encoded texture data block, and to data values for individual texture elements, encompass data values that each comprise or include a combination of values, such as a set of colour values (RGB or RGBa), as appropriate.

In the technology described herein, each encoded texture data block encodes (represents) a smaller portion (or block) of the texture map in question, as in traditional block encoding techniques. In an embodiment the texture map being encoded is divided into blocks of equal size, i.e. each encoded texture data block represents the same number of texture data elements. This can, e.g., simplify the task of finding which encoded block a given texture data element lies in. In an embodiment each encoded texture data block encodes the equivalent of a 4×4, 5×5, 6×6, 8×8, 10×10, 12×12, 3×3×3, 4×4×4, 5×5×5 or 6×6×6 array of texels. (It is an advantage of the technology described herein that it can support many different block sizes.)

In an embodiment each encoded texture data block has the same size, i.e. a fixed rate encoding scheme is used for the texture map in question. This facilitates the encoding and decoding processes, as is known in the art. The actual subdividing of the texture map into smaller blocks, and the order of encoding into texture blocks can be selected as desired. In an embodiment the blocks are encoded in raster order, although other arrangements, such as the use of Morton order, would, of course, be possible.

The encoding process for each sub-set of texture data elements to be encoded as an encoded data block can be carried out in any suitable manner on or using the original texture data that is to be encoded. For example, as in known prior art processes, a sub-set of texture data elements to be encoded could be, and in an embodiment is, first encoded using some or all of the various different encoding possibilities that are available (i.e. that, in effect, an encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block (sub-set of texels) when it is encoded).

This will then be repeated for each different sub-set of texture data elements that the original data (e.g. texture map) has been divided into, to produce a stream or set of encoded texture data blocks representing, and corresponding to, the original set of data (e.g. texture map). This set of encoded texture data blocks can then be stored, e.g. on a portable storage device such as a DVD, for later use when it is desired to apply the texture to an image to be rendered. In an embodiment a texture is encoded as a set of mipmaps, with each mipmap being generated in the manner of the technology described herein.

Each sub-set (block) of texture data elements that the original data (e.g. texture map) is divided into for encoding purposes is in an embodiment the same size. The sub-set (i.e. block) size that is being used is in an embodiment provided to the decoder. The sub-set size is in an embodiment not included in the encoded texture data blocks themselves, but is in an embodiment provided to the decoder separately. For example, the sub-set size could be implicitly indicated by another parameter that is provided to the decoder, such as, and in an embodiment, the image type, or included in (and indicated in) a (global) data header that is associated with (attached to) the set of encoded texture data blocks.

The above primarily describes the encoding of the texture data in the technology described herein. As will be appreciated by those skilled in the art, the technology described herein also extends to the reverse, decoding, process, i.e. in which an encoded texture data block or blocks is used to produce one or more or an array of texture data elements for use.

Thus, the technology described herein also extends to a decoder and a decoding apparatus configured to decode a texture that has been encoded in the manner of the technology described herein.

The decoding process and decoder in an embodiment first determine which encoded texture data block in the set of encoded texture data blocks representing the texture in question represents (contains) the texture data element of interest (whose value is required). This is in an embodiment done based on the position of the texture data element in question.

The encoded texture data block to use can be determined based on the position of the texture data element in question in any desired and suitable manner. However, in an embodiment it is done by, in an embodiment first, identifying a "candidate" encoded texture block based on the texture data element's position, and, in an embodiment then, determining if, in fact, a different encoded block is needed to decode the texture data element (i.e. in fact represents the texture data element), based on a relative position (e.g., and in an embodiment an index) for the texture data within the candidate encoded texture data block.

The Applicants have found that this can allow a decoder to efficiently identify the encoded block to decode for a given texture data element where the encoded texture data blocks represent non-rectangular sub-sets of texture data elements from the original texture (and thus, e.g., facilitates random access into an encoded texture for which the encoded texture data blocks represent non-rectangular sub-sets of texture data elements).

It is believed that such decoding arrangements may be new and advantageous in their own right.

Thus, another embodiment of the technology described herein comprises a method of determining a texture data element value for use in a graphics processing system from a set of encoded texture data blocks representing a texture to be used in the graphics processing system, the method comprising:

using the position of a texture data element whose value is required and the block size used for the set of encoded texture data blocks representing the texture to be decoded to determine a candidate encoded texture data block in the set of encoded texture data blocks representing the texture to use to determine the value to use for the texture data element whose value is required; and using a relative position within the determined candidate encoded texture data block for the texture data element whose value is required to determine whether to use the determined candidate encoded texture data block to determine the value to use for the texture data element whose value is required, or whether to use another encoded texture data block to determine the value to use for the texture data element whose value is required; and if it is determined to use the determined candidate encoded texture data block to determine the value to use for the texture data element whose value is required, using the candidate encoded texture data block to determine the value to use for the texture data element whose value is required; and if it is determined to use another encoded texture data block to determine the value to use for the texture data element whose value is required, using the another encoded texture data block to determine the value to use for the texture data element whose value is required.

Another embodiment of the technology described herein comprises an apparatus for determining a texture data element value for use in a graphics processing system from a set of encoded texture data blocks representing a texture to be used in the graphics processing system, the apparatus comprising:

processing circuitry configured to:

use the position of a texture data element whose value is required and the block size used for the set of encoded texture data blocks representing a texture to be decoded to determine a candidate encoded texture data block in the set of encoded texture data blocks representing the texture to use to determine the value to use for the texture data element whose value is required; and use a relative position within the determined candidate encoded texture data block for the texture data element whose value is required to determine whether to use the determined candidate encoded texture data block to determine the value to use for the texture data element whose value is required, or whether to use another encoded texture data block to determine the value to use for the texture data element whose value is required; and if it is determined to use the determined candidate encoded texture data block to determine the value to use for the texture data element whose value is required, use the candidate encoded texture data block to determine the value to use for the texture data element whose value is required; and if it is determined to use another encoded texture data block to determine the value to use for the texture data element whose value is required, use the another encoded texture data block to determine the value to use for the texture data element whose value is required.

As will be appreciated by those skilled in the art, these embodiments of the technology described herein can, and in an embodiment do, include any one or more or all of the features of the technology described herein described herein, as appropriate.

The candidate encoded texture data block is in an embodiment identified by dividing the texture data element's position co-ordinates by the (rectangular) block size that was used when encoding the texture (as in conventional block encoding schemes). (The block size is provided to the decoder, as discussed above). This then identifies a candidate encoded block to use for the texture data element.

The decoding process and decoder then use a (relative) position (index) within the block for the texture data element to determine if the candidate encoded block should be used to decode the texture data element, or if a different encoded block should be used.

The relative position within the candidate block used for the texture data element is in an embodiment the position within the block that the texture data element's position (co-ordinates) would correspond to if each encoded block representing the texture represented a rectangular sub-set of texture data elements from the original texture. Thus, the decoding process and decoder in an embodiment determine what the texture data element's (relative) position (e.g. and in an embodiment an index) within the block would be on the assumption that rectangular blocks are being used, and use that determined relative position (index) to determine if the candidate encoded block should be used to decode the texture data element, or if a different (and in an embodiment adjacent) encoded block should be used.

In an embodiment, the relative position within the candidate encoded block to use for the texture data element is based on the position (co-ordinates) of the texture data element (and is in an embodiment determined using the position (co-ordinates) of the texture data element). Thus, in an embodiment, the position of the texture data element whose value is required is used to determine the relative position within the candidate encoded block that is used to determine whether to use the candidate encoded block or another block.

In an embodiment, the relative position within the candidate encoded block for the texture data element is determined as the (integer) remainder when the texture data element's position co-ordinates are divided by the block size being used (as in conventional block encoding schemes).

Thus, in an embodiment, the decoder and decoding process use the position of a texture data element whose value is required and the block size used for the set of encoded texture data blocks representing the texture to be decoded to determine a relative position within the determined candidate encoded texture data block for the texture data element whose value is required, and then use that determined relative position to determine whether to use the determined candidate encoded texture data block to determine the value to use for the texture data element whose value is required, or whether to use another encoded texture data block to determine the value to use for the texture data element whose value is required.

The relative position for the texture data element within the block is in an embodiment tested to determine if that is a (relative) texture data element position that indicates that a different encoded texture data block should in fact be used to decode the texture data element in question. This test in an embodiment operates to determine if the relative position for the texture data element within the block is a texture data element position that was shifted (moved) into another block when the texture was encoded (as discussed above) or not. Thus, it is in an embodiment tested if the texture data element's effective relative position within the candidate block is a block position that was replaced and/or swapped with a texture data element from another block when the texture was encoded.

If the relative position within the candidate encoded block for the texture data element does not lie at a position within the candidate encoded block that indicates that a different encoded texture data block should in fact be used to decode the texture data element in question (e.g. that is determined to have been shifted to another block when the texture was encoded), then the candidate encoded block (and the relative position within that block for the texture data element) may then be, and is in an embodiment then, used to decode (to determine the value to use for) the texture data element in question.

On the other hand, if the relative position within the candidate encoded block for the texture data element does lie at a position within the candidate encoded block that indicates that a different encoded texture data block should in fact be used to decode the texture data element in question (e.g. lies at a position within the block that is determined to have been shifted to another block when the texture was encoded), then a different encoded block to be used to decode the texture data element (namely, e.g., and in an embodiment, the block that that texture data element position was shifted to when the texture was encoded) should be, and is in an embodiment determined, and then that other encoded block used to decode (to determine the value to use for) the texture data element in question.

The decoding process and decoder in an embodiment use a predetermined encoded block selection function to determine whether to use the candidate encoded texture data block, or a different encoded texture data block, to determine the value of the texture data element in question.

The determining of whether to use the candidate encoded texture data block, or a different encoded texture data block, to determine the value of the texture data element in question based on the relative position of the texture data element within the candidate encoded texture data block can be carried out as desired. In an embodiment, the arrangement is such that certain selected, in an embodiment predetermined, texture data element positions (indexes) within the block indicate that another encoded block should be used, with any other position (with the remaining positions within the block) indicating that the candidate encoded block should be used.

Thus, in an embodiment for any given encoded texture data block (and for each encoded texture data block) there are a number of (and in an embodiment plural) texture data element positions (indexes) within the block that indicate that another encoded block should be used, with any other relative texture data element position within the block indicating that the candidate encoded block should be used. Similarly in an embodiment some but not all of the texture data element positions within an encoded block indicate that another encoded block should be used, with the other texture data element positions indicating that the candidate encoded block should be used.

The (relative) texture data element positions that indicate that another encoded block should be used to determine the value of the texture data element in question are in an embodiment texture data element positions that are not spaced inwardly too far from the edge of the (assumed) rectangular block of texels that the encoded block represents. In an embodiment only texture data element positions that are at the edge or one position inside the edge of the assumed rectangular block can trigger using a different encoded block to decode the texture data element in question.

As discussed above, this helps to allow the encoding and decoding processes to try to still maintain at least some spatial coherence between the texture data elements, where non-rectangular sub-sets (blocks) of texture data elements are being encoded.

In one embodiment, only texture data element positions that are on the edge of the assumed rectangular block can trigger using a different encoded block to decode the texture data element in question.

In another embodiment, texture data element positions that are one position inside the edge of the assumed rectangular block can trigger using a different encoded block to decode the texture data element in question. This may be instead of, or as well as, texture data element positions that are on the edge of the assumed rectangular block triggering using a different encoded block to decode the texture data element in question.

In these arrangements, texture data element positions within the block that indicate that another encoded block should be used can be selected as desired. In an embodiment not every position along the edge of the rectangular block indicates that another encoded block should be used. Thus, in an embodiment some but not all of the positions along the edge of the rectangular block indicate that another encoded block should be used.

The position(s), e.g. along the edges, that indicate that another encoded block should be used could be selected, for example, in a pseudo-random fashion.

However, in an embodiment, a predetermined selection pattern (mapping) is used to determine (select) and identify which texture data element, e.g. edge, positions indicate that another encoded block should be used. This selection pattern in an embodiment divides the block edge positions into groups of a fixed number of edge positions (such as 2, 3 or 4 edge positions), with at least one (and in an embodiment only one) particular position (and in an embodiment the same particular position) within each group of edge positions then indicating that another encoded block should be used.

In these arrangements, the size of the group of edge positions will accordingly in effect define the frequency around the edge of the assumed rectangular block of texels at which another encoded block will be used to decode the texture data element in question (and thus can be looked on as a "period" value). The particular position(s) within the group of edge positions can correspondingly be thought of as a "phase" value. In effect therefore, this arrangement will divide the edge positions around the assumed rectangular block into groups or sets, with at least one particular position in each group or set then indicating that another encoded block should be used.

In an embodiment the arrangement is such that at least one texture data element position on each edge of the rectangular block indicates that another encoded block should be used. In an embodiment every other texel position on the edges of the rectangular block indicates that another encoded block should be used. The Applicants have found that this can be particularly effective at reducing or avoiding the effects of block edge artefacts in a decoded texture.

In these arrangements, the size of the groups (sets) of edge positions (the "period") is in an embodiment a power of two (as this then facilitates implementing the process in hardware). In one embodiment, each group (set) of edge positions contains two edge positions (i.e. the "period" is 2). This then means that every other edge position will indicate that another encoded block should be used. The Applicants have found that this can be particularly effective at reducing block edge artefacts. In this case, the Applicants have found that for even-sized rectangular blocks, it does not matter which edge position of the pair of edge positions in each group (set) is "displaced" (i.e. the "phase" can be "0" or "1"). However, for odd-sized rectangular blocks, in an embodiment the edge positions that do not lie exactly at the corners of the rectangular block are "displaced", i.e. the "phase" is "1", as this tends to "round off" the decoded block corners.

In an embodiment a predetermined position selection function, in which the "period" and "phase", as discussed above, can be set is used to determine which edge positions indicate that another encoded block should be used.

In an embodiment this edge position selection function comprises numbering the texture data element positions clockwise along each edge of the assumed rectangular blocks of texels, starting from zero, then dividing this number by the specified "period" value and comparing the remainder with the specified "phase" value. If the period is a power of two, this can be achieved by comparing the number of lowest bits corresponding to the power in the power of two period (so the lowest bit if the period is 2 ($2^1$), the lowest two bits if the period is 4 ($2^2$), and so on) of the number of edge positions with the phase (and so is easy to implement in hardware).

Thus, in an embodiment, it is (relative) texture data element positions along the edges (and in an embodiment at regular intervals along the edges) of the candidate encoded texture data block, such as, and in an embodiment, every other edge position, that indicate that another encoded block should be used.

Where it is determined that a different encoded texture data block should in fact be used to decode the texture data element in question, then the another encoded block to use can be selected or desired. In an embodiment another encoded texture data block that is (spatially in the texture) adjacent to the candidate encoded block is used to decode the texture data element in question. This helps to maintain and exploit any spatial inherency in the original texture. In an embodiment the encoded texture data block that adjoins (abuts) the edge of the candidate encoded block that the texture data element lies on (or is nearest to) is selected (and used as) the another encoded texture data block to be used to determine the value of the texture data element in question.

Again, the decoding process and decoder in an embodiment use a predetermined encoded block selection function to determine which another encoded texture data block to use to determine the value of the texture data element in question (where that is required).

In an embodiment, the encoded texture data blocks representing the texture are indexed (addressed) in order, and the another encoded block to use is in an embodiment determined by adjusting the index (address) within the set of encoded blocks of the candidate encoded block by one in the x or y (for 2D textures) or in the x, y or z (for 3D textures) dimension (e.g., and in an embodiment, depending upon which edge of the candidate block the texture data element lies on or is nearest to), to give the index (address) of the another encoded texture data block to use.

Thus, in an embodiment the method and system of the technology described herein are configured or arranged such that there is a, in an embodiment predetermined, mechanism or process for determining the index (address) of an encoded block at (x, y) (or (x, y, z) for 3D), and the adjusted block index (address) is the index (address) of the block at (x+1, y), (x−1, y), (x, y+1), or (x, y−1) (or for 3D also at (x, y, z+1) or (x, y, x−1)), depending upon the direction of the adjoining edge (depending upon which edge of the candidate block the texture data element lies on or is nearest to).

It will be appreciated in this regard that the order of determining the candidate block index (address) and then the block index (address) adjustment (e.g. offset) can be performed in any desired order, i.e. by determining the candidate block first and then the block offset (if any) or vice-versa, as the end result of identifying which block is to be decoded will be the same either way.

Where it is determined that another, different, encoded texture data block should in fact be used to decode the texture data element in question, then the decoding process and decoder in an embodiment also determines a new, adjusted relative position for the texture data element in the another encoded texture data block, which new relative position that is then used to decode the texture data element (to determine its value) (using the another encoded texture data block). This new relative position is in an embodiment the relative position that the texture data element was shifted to in the another texture data block when encoding the texture (which may not be, and typically won't be, the same as the relative position determined for the texture data element in the candidate block). The texture data element can then be and is in an embodiment decoded based on that new relative position of the texture data element in the new encoded block.

The adjusted relative position (index) of the texture data element in the another encoded block is in an embodiment determined based on the relative position of the texture data element in the candidate encoded texture data block, in an embodiment by shifting the relative position of the texture data element in the candidate encoded block to an associated (and corresponding) position in the another encoded block. In an embodiment, the relative position of the texture data element is shifted to the relative position in the another encoded block of a texture data element that the texture data element to be decoded was replaced and/or swapped with when encoding the texture.

Where a new, adjusted relative texture data element position in the another encoded texture data block is to be used to decode the texture data element in question, then the new, adjusted relative texture data element position in the another encoded block to use can be selected as desired. In an embodiment the new, adjusted relative position in the another encoded texture data block is a texture data element position that is not spaced too far apart from the relative position for the texture data element in the candidate encoded texture data block.

Similarly, the new, adjusted (relative) texture data element position in the another encoded block to be used to determine the value of the texture data element in question is in an embodiment a texture data element position that is not spaced inwardly too far from the edge of the (assumed) rectangular block of texels that the another encoded block represents. In an embodiment the new, adjusted texture data element positions are at the edge or one position inside the edge of the assumed rectangular block the another encoded texture data block represents.

As discussed above, this again helps to allow the encoding and decoding processes to try to still maintain and exploit at least some spatial coherence between the texture data elements, where non-rectangular arrays (blocks) of texture data elements are being encoded.

In one embodiment, the new, adjusted texture data element positions are on the edge of the assumed rectangular block that the another encoded texture data block represents.

In another embodiment, the new, adjusted texture data element positions are one position inside the edge of the assumed rectangular block that the another encoded texture data block represents. This may be instead of, or as well as, texture data element positions that are on the edge of the assumed rectangular block that the another encoded texture data block represents.

In an embodiment, a predetermined texture data element position adjustment function (mapping) is used to determine (select) the adjusted texture data element position to be used.

In an embodiment, a new, adjusted relative texture data element position in the another encoded texture data block that is (spatially in the texture) adjacent to the relative position for the texture data element in the candidate encoded block is used to decode the texture data element in question. This again helps to maintain and exploit any spatial coherency in the original texture. In an embodiment a new, adjusted relative texture data element position in the another encoded texture data block that adjoins (abuts) the relative position for the texture data element in the candidate encoded block is selected (and used as) the new, adjusted relative texture data element position in the another encoded texture data block to be used to determine the value of the texture data element in question.

Again, the decoding process and decoder in an embodiment use a predetermined texture data element position adjusting function to determine the adjusted relative texture data element position to use in the another encoded texture data block to determine the value of the texture data element in question.

In an embodiment, the new, adjusted relative texture data element position in the another encoded block to use is determined by adjusting the relative position for the texture data element in the candidate encoded block by one in the x or y (for 2D textures) or in the x, y or z (for 3D textures) dimension (e.g., and in an embodiment, depending upon which edge (or face, for 3D textures) of the candidate block the texture data element lies on or is nearest to), to give the new, adjusted relative texture data element position in the another encoded texture data block to use.

The relative texture data element position adjustment in an embodiment generates an adjusted relative texture data element position in the another encoded texture data block that is the texture data element's complementary position on the other side of the edge between the candidate encoded texture data block and the another encoded texture data block that is actually to be used to determine the value of the texture data element in question. The texture data elements are in an embodiment allocated indexes (addresses) based on their relative positions within an encoded texture data block, and the relative texture data element position adjustment in an embodiment operates to adjust the index (address) to be used to identify the texture data element to be decoded within the encoded texture data block to represent the complementary position for the texture data element on the other side of the edge between the candidate block and the another encoded texture data block.

Once the new, adjusted relative position in the another encoded texture data block to use for the texture data element has been determined, that position can then be and is in an embodiment then used when decoding the another encoded texture data block to determine the value to use for the texture data element in question.

Thus, in an embodiment, the decoding process and the decoder of the technology described herein operate to determine a candidate encoded block and relative position within that block to use for a texture data element to be decoded, using the texture data element's position in the texture and the block size being used, on the basis that the encoded texture data blocks each represent rectangular arrays of texture elements, but then, if necessary, change the encoded block, and adjust the texture data element's relative position within the block, before decoding the texture data element, based on the determined relative position of the texture data element within the determined candidate encoded block.

As discussed above, in an embodiment, the changing of the encoded block (the block adjustment) operates to adjust the block index (address) to fetch data from an immediately adjoining block to the encoded block determined using the texture data element's position in the texture and the block size being used. Similarly, in an embodiment the adjustment of the texture data element's relative position adjusts the index (address) for the texel determined using the texture data element's position and the block size being used to the complementary position for that relative position on the other side of the edge between the encoded block determined using the texture data element's position and the texture and block size being used and the changed (adjusted) encoded block.

The inputs to the block and texture data element position determining process and function thus in an embodiment comprise the position of the texture data element of interest (so (x,y) co-ordinates for 2D textures and (x,y,z) co-ordinates for 3D textures), and the size of the encoded blocks (the size of the rectangular (for 2D) or rectangular cuboid (for 3D) array of texture data elements that each encoded block effectively encodes) (so the width and height of the blocks for 2D blocks, and the width, height and depth of the blocks for 3D blocks).

The decoding process (and decoder) in an embodiment further comprises determining if the texture data element whose value is to be determined lies on an (outer) edge (or face, for 3D textures) of the texture, and if it does, then simply determining the texture data element's value using the determined candidate encoded texture data block. This will conveniently ensure that the outer edges of the texture map can be retained as straight lines in the encoded (and then the decoded) texture.

In an embodiment this is achieved by the decoding process comparing the positions of the edges of the texture to be decoded with the position of the texture data element whose value is required. Thus, in an embodiment, the inputs to the block and texture data element position determining process and function also comprise the overall size of the encoded texture (so the texture's width and height for a 2D texture, and width, height and depth for a 3D texture).

In an embodiment, the decoding process (and decoder) operates to, for certain selected, and in an embodiment predetermined, encoded texture data blocks in the set of encoded texture data blocks representing the texture, adjust the relative texture data element positions within the determined candidate encoded texture data block that will trigger the use of another encoded texture data block (before then using the relative position of the texture data element within the determined candidate encoded texture data block to determine whether to use the determined candidate encoded texture data block or another encoded texture data block to determine the texture data element's value). This is in an embodiment done based on the relative position (the index) of the determined candidate encoded texture data block within the set of encoded texture data blocks representing the texture in question.

This can allow the decoding process to straightforwardly allow for situations where plural different, e.g. complementary, block shapes are used when encoding the texture (as discussed above).

This arrangement is in an embodiment such that every other block position in the set of encoded texture data blocks indicates (and triggers) an adjustment to the relative texture data element positions that will trigger the use of another encoded texture data block. This will then allow the decoder to more straightforwardly decode a texture that has been encoded using a chequerboard block layout, for example.

Where the relative texture data element positions with the determined candidate block that will trigger the use of another encoded texture data block are to be adjusted, then those positions can be adjusted as desired. In an embodiment, the adjustment comprises reflecting the (original) relative texture data element positions that will trigger the use of another encoded texture data block along each axis (so in x and y for 2D blocks and in x, y, and z for 3D blocks) for successive blocks (such that as you move along the axis, every other block is a reflected version of the previous block along that axis, i.e. such that if one were to look at a row of blocks moving along the x-axis, for example, adjacent blocks would be reflected left-to-right (the x-coordinates of their constituent elements would be swapped), and if one were to look at a column of blocks moving along the y-axis, adjacent blocks would be reflected top-to-bottom (their constituent element y-coordinates would be swapped) (and similarly for the z-axis for 3D blocks)), to give the adjusted relative texture data element positions (indexes) in the candidate encoded texture data block that will trigger the use of another encoded texture data block.

Once the encoded block, and the relative position (index) within that block, to use for the texture data element have been determined, the texture data element can then be (and is in an embodiment) decoded (i.e., the value to use for it determined), using the determined encoded block and relative position within the block. The block should be decoded using the appropriate block decoding process (scheme), i.e. using the decoding scheme that corresponds to the encoding scheme that was used when encoding the texture (and thus will essentially be the reverse of the block encoding process).

It will be appreciated here that the using of the determined encoded block and relative position within the block to determine the data value to use for the texture data element in question may be done by decoding the entire encoded texture data block, or it may comprise simply decoding the required value from within the block (and in an embodiment that is the case), e.g., depending upon the decoding scheme being used.

As discussed above, because the encoding and decoding process of the technology described herein does not affect the value of the texture data elements, only their position (i.e., in which block and where in the block they are encoded), once the block and (relative) texture data element position within the block to be decoded have been identified, the texture data element can then simply be decoded using the appropriate, e.g. known or conventional, block-based decoding scheme.

Thus, in an embodiment, the encoded block is decoded using a known (and the appropriate) block decoding scheme (and decoder), such as an S3TC, BC6, BC7 or ASTC decoder. The block decoding process accordingly in an embodiment comprises determining a set of base data values (e.g. endpoint colours) to be used for the block, and then generating the data value (e.g. colour) for the individual texture data element or elements of the block in question accordingly.

Thus, in the case of an ASTC decoder, for example, the decoding process for an individual texture data element (once the encoded block and relative position to use for the texture data have been determined as discussed above) will comprise reading and decoding from the encoded texture data block, data for generating a set of base data values to be used to derive the data value for the texture data element; reading and decoding integer values to be used for that process and thereby generating the set of base data values (e.g., and in an embodiment endpoint colour values) to be used to determine the data value for the texture data element in question; determining an index value for the texture data element, using a defined index mode; and interpolating between the generated data values (e.g. endpoint colours) using the index value to give the final decoded texture data element data value (e.g. colour) to use for the texture data element in question. It may also comprise determining a partitioning pattern to be used (that has been used) for the block, and the set of base data values (e.g. endpoint colours) to be used for a partition of the block, and then generating the data value (e.g. colour) for the texture data element accordingly.

The decoding process may be repeated for each texture data element of the block whose value is required (and for texture data elements in other encoded blocks).

The so-generated, decoded texture data element value or values can then be, and in an embodiment are then, applied, as is known in the art, to a sampling position or positions and/or a fragment or fragments that are being rendered to generate rendered data for the sampling position(s) and/or fragment(s), which rendered data is then, e.g., and in an embodiment, written to a tile or other buffer, e.g. for output to a frame buffer for a display to display the "textured" sampling position(s) and/or fragment(s).

The decoding process can, and indeed in an embodiment does, otherwise include any one or more or all of the various features of the technology described herein discussed herein, as appropriate.

In an embodiment, the decoder (decoding apparatus) is implemented in the device that is to use the encoded textures, such as a graphics processor. The decoder is in an embodiment implemented as a dedicated hardware element that is configured to carry out the decoding process.

Although the technology described herein has been described above primarily with reference to the encoding and decoding of two-dimensional textures, as discussed above, the technology described herein can equally and analogously be applied to three-dimensional textures. In this case each sub-set of texture data elements that is encoded should accordingly be a non-rectangular cubical sub-set of texels from the original texture and the equivalent "edges" of the blocks and sub-sets of the texture data elements will in the 3D case be the "faces" of the relevant "cuboid" sub-sets of texture data elements (such that in the 3D case, the effect is to "crinkle" the faces of a cuboid, rather than the edges of a rectangle). In this case, a sub-set of texels on (and/or inward of) the face of the cuboid will accordingly be displaced into the neighbouring cuboid block. This can be done in an analogous manner to the 2D case, by using two periods and two phases (as discussed above) respectively measured along and across each cuboid face.

Although the technology described herein has been described above with particular reference to the encoding of texture data for use in a graphics processing system, as will be appreciated by those skilled in the art, it would equally be applicable to the encoding of other forms of data, and in particular to data that is in the form of (or can be expressed in the form of) arrays or blocks of (similar) data elements (e.g. data elements whose values follow a common or similar format and/or that will be or can be used for a similar or the same purpose or that represent similar information).

Such "non-graphics" data could comprise, for example, data for geographical information systems, such as topography maps, etc., vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded (and decoded) in an analogous manner to the texture data as described herein.

Thus, another embodiment of the technology described herein comprises a method of encoding an array of data elements to be used in a data processing system, the method comprising:
    encoding the array of data elements as a plurality of encoded data blocks, each encoded data block representing a sub-set of the data elements of the array of data elements to be encoded and containing data to allow decoded data values for the sub-set of the data elements that the block represents to be determined; and wherein:
    at least one of the encoded data blocks represents a non-rectangular sub-set of data elements from the array of data elements to be encoded.

Another embodiment of the technology described herein comprises an apparatus for encoding an array of data elements to be used in a data processing system, the apparatus comprising:
    processing circuitry configured to encode the array of data elements as a plurality of encoded data blocks, each encoded data block representing a sub-set of the data elements of the array of data elements to be encoded and containing data to allow decoded data values for the sub-set of the data elements that the block represents to be determined; and wherein:
    at least one of the encoded data blocks represents a non-rectangular sub-set of data elements from the array of data elements to be encoded.

Similarly another embodiment of the technology described herein comprises a method of encoding an array of data elements to be used in a data processing system, the method comprising:
    dividing the array of data elements into a plurality of non-rectangular sub-sets of data elements; and
    encoding the non-rectangular sub-sets of data elements that the texture has been divided into to provide a set of encoded data blocks representing the texture.

An embodiment of the technology described herein comprises an apparatus for encoding an array of data elements to be used in a data processing system, the apparatus comprising:
    processing circuitry configured to:
    divide the array of data elements into a plurality of non-rectangular sub-sets of data elements; and
    encode the non-rectangular sub-sets of data elements that the data array has been divided into to provide a set of encoded data blocks representing the array of data elements.

Another embodiment of the technology described herein comprises a method of encoding an array of data elements to be used in a data processing system, the method comprising:
    dividing the array of data elements into a plurality of non-rectangular sub-sets of data elements that are configured such that the array of data elements has effectively been divided into a plurality of smaller rectangular sub-sets of data elements, and then, for at least one (and in an embodiment for all) of the rectangular sub-set of data elements, at least one data element of the sub-set has been replaced with a data element from another one of the rectangular sub-sets of data elements, such that the (or each) sub-set effectively then contains at least one data element from what would be another rectangular sub-set of data elements from the array of data in the place of a data element that was originally in the sub-set; and
    encoding of the non-rectangular sub-sets of data elements that the array of data elements has been divided into to provide a set of encoded data blocks representing the array of data elements.

An embodiment of the technology described herein comprises an apparatus for encoding an array of data elements to be used in a data processing system, the apparatus comprising:
    processing circuitry configured to:
    divide the array of data elements into a plurality of non-rectangular sub-sets of data elements that are configured such that the array of data elements has effectively been divided into a plurality of smaller rectangular sub-sets of data elements, and then, for at least one (and in an embodiment for all) of the rectangular sub-sets of data elements, at least one data element of the sub-set has been replaced with a data element from another one of the rectangular sub-sets of data elements, such that the (or each) sub-set effectively then contains at least one data element from what would be another rectangular sub-set of data elements from the array of data elements in the place of a data element that was originally in the sub-set; and
    encode the non-rectangular sub-sets of data elements that the array of data elements has been divided into to provide a set of encoded data blocks representing the array of data elements.

Similarly, another embodiment of the technology described herein comprises a method of encoding an array of data elements to be used in a data processing system, the method comprising:
    dividing the array of data elements into a plurality of non-rectangular sub-sets of data elements that are configured such that the array of data elements has effectively been divided into a plurality of smaller rectangular sub-sets of data elements, and then, for at least one pair of the rectangular sub-sets of data elements, at least one pair of data elements has been swapped between the sub-sets, such that when the sub-sets are encoded, each sub-set of the pair of sub-sets then contains at least one data element from the other sub-sets of the pair of sub-sets in the place of a data element that was originally in the sub-set; and encoding the non-rectangular sub-sets of data elements that the array of data elements has been divided into to provide a set of encoded data blocks representing the array of data elements.

Another embodiment of the technology described herein comprises an apparatus for encoding an array of data elements to be used in a data processing system, the apparatus comprising:

processing circuitry configured to:

divide the array of data elements into a plurality of non-rectangular sub-sets of data elements that are configured such that the array of data elements has effectively been divided into a plurality of smaller rectangular sub-sets of data elements, and then for at least one pair of the rectangular sub-sets of data elements at least one pair of data elements has been swapped between the sub-sets, such that when the sub-sets are encoded, each sub-set of the pair of sub-sets then contains at least one data element from the other sub-set of the pair of sub-sets in the place of a data element that was originally in the sub-set; and encode the non-rectangular sub-sets of data elements that the array of data elements has been divided into to provide a set of encoded data blocks representing the array of data elements.

Thus, another embodiment of the technology described herein comprises a method of determining a data element value for use in a data processing system from a set of encoded data blocks representing a array of data elements to be used in the data processing system, the method comprising:

using the position of a data element whose value is required and the block size used for the set of encoded data blocks representing the array of data elements to be decoded to determine a candidate encoded data block in the set of encoded data blocks representing the array of data elements to use to determine the value to use for the data element whose value is required; and using a relative position within the determined candidate encoded data block for the data element whose value is required to determine whether to use the determined candidate encoded data block to determine the value to use for the data element whose value is required, or whether to use another encoded data block to determine the value to use for the data element whose value is required; and if it is determined to use the determined candidate encoded data block to determine the value to use for the data element whose value is required, using the candidate encoded data block to determine the value to use for the data element whose value is required; and if it is determined to use another encoded data block to determine the value to use for the data element whose value is required, using the another encoded data block to determine the value to use for the data element whose value is required.

Another embodiment of the technology described herein comprises an apparatus for determining a data element value for use in a data processing system from a set of encoded data blocks representing an array of data elements to be used in the data processing system, the apparatus comprising:

processing circuitry configured to:

use the position of a data element whose value is required and the block size used for the set of encoded data blocks representing an array of data elements to be decoded to determine a candidate encoded data block in the set of encoded data blocks representing the array of data elements to use to determine the value to use for the data element whose value is required; and use a relative position within the determined candidate encoded data block for the data element whose value is required to determine whether to use the determined candidate encoded data block to determine the value to use for the data element whose value is required, or whether to use another encoded data block to determine the value to use for the data element whose value is required; and if it is determined to use the determined candidate encoded data block to determine the value to use for the data element whose value is required, use the candidate encoded data block to determine the value to use for the data element whose value is required; and if it is determined to use another encoded data block to determine the value to use for the data element whose value is required, use the another encoded data block to determine the value to use for the data element whose value is required.

The methods and apparatus of the technology described herein can be implemented in any appropriate manner, e.g. in hardware or software, and in (and be included in) any appropriate device or component. In an embodiment they are implemented in a processor, and thus the technology described herein also extends to a processor configured to use the methods of the technology described herein, or that includes the apparatus of the technology described herein. In an embodiment, the methods and apparatus of the technology described herein are implemented in hardware, in an embodiment on a single semi-conductor platform.

The technology described herein can be implemented in any suitable system, such as a suitably configured microprocessor based system. In an embodiment, the technology described herein is implemented in a computer and/or microprocessor based system.

The technology described herein may, for example, be implemented on a graphics processor or graphics processing device, and accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements or processing circuitry and/or programmable hardware elements or processing circuitry that can be programmed to operate in the desired manner. The various functional elements may be separate to each other or may share circuitry (e.g. be performed by the same processor and/or processing circuitry) as desired.

In one embodiment the apparatus of the technology described herein comprises dedicated (non-programmable) processing circuitry configured to operate in the manner described. In another embodiment, it comprises programmable processing circuitry that is programmed to operate in the manner described.

Some embodiments of the data processing system, graphics processing system, data processors, graphics processors, processing circuitry, apparatus, etc., may be in communication with memory and/or more memory devices that store the data described herein, such as the data (e.g. the input and/or output data) for the texture, texture data elements, encoded texture data blocks, etc., and/or that store software for performing the processes described herein. The data processing system, graphics processing system, data processors, graphics processors, processing circuitry, apparatus, etc., may also be in communication with a display for displaying images based on the decoded data.

It should also be noted here that, as will be appreciated by those skilled in the art, the various functions, etc., of the technology described herein may be duplicated and/or carried out in parallel on a given processor.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a field programmable gate array (FPGA), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to the encoding of texture data for use in graphics processing that is in the form of a colour map (i.e. colour data). However, as discussed above, and as will be appreciated by those skilled in the art, the technology described herein is applicable to data encoding in general, and so therefore should not be considered to be limited to the present example of texture colour data encoding.

FIG. 1 illustrates the basic encoding process of this embodiment. As shown in FIG. 1, an original image or array 1 of texture data elements (texels) (a texture "map") is subdivided into a plurality of 4×4 texture element blocks 2 for encoding purposes. (Other block sizes can be used, as will be discussed further below.)

In the present embodiment, as shown in FIG. 1, the original image (texture map) 1 is divided into blocks of equal size. This simplifies the task of finding which block a given texture data element lies in, and gives a constant data rate.

In this embodiment, each texture element (texel) in the original texture map data array (image) represents the colour to be used at the position of the respective texture element, and accordingly has allocated to it a data value comprising a set of colour values (e.g. red, green, blue (RGB), and, optionally, alpha (transparency), values). In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array 1 of colour data in its full, original form, each 4×4 texture element block 2 is encoded as a texture data block 5 that has a reduced size as compared to the texture data in its original, unencoded form. This, in effect, compresses the original texture data, thereby making its storage and processing easier and more efficient. In the present embodiment, each encoded texture data block 5 uses 128 bits. (Other arrangements would, of course, be possible.)

Each encoded, reduced size, texture data block 5 contains sufficient and appropriate data to allow data corresponding to or representing the original, unencoded, data of the 4×4 texture element block in question to be reproduced. In the present embodiment, the texture data is encoded using the ASTC encoding scheme. Other arrangements would, of course, be possible.

For each block 2 of the original image (texture map) 1, a corresponding encoded texture data block 5 is generated. The individual texture data blocks making up the texture map are encoded in the present embodiment in raster order. Other arrangements, such as the use of Morton order, would, of course, be possible.

Thus, in the present embodiment, each encoded texture data file comprises a sequence of individual texture data blocks encoding the array of texture data elements (the image data).

The number of texture data blocks in the file will depend on the size of the texture map (texture data array) that is being encoded, and, e.g., whether the data is being stored in mipmap form. If mip-maps are used, then if the first level of texture map resolution is encoded using "n" texture data blocks, there will be "n/4" texture data blocks for the mipmap level below, "n/16" blocks for the next mip-map, "n/64" for the next, "n/256" for the next again, and so on (but no less than one block for each level) until the mip-map level with size 1×1 is reached.

(In the present embodiment, the encoded texture data can be and in an embodiment is stored in the form of mip-maps (i.e. where multiple versions of the original texture data array, each having different levels of detail (resolution), are stored for use). The mip-maps are in an embodiment stored one after each other in memory, with each mip-map level being, as is known in the art, a downscaled (by a factor of 2) representation (image) of the original array (image). The mip-maps are stored in order of descending resolution, i.e. n×n, . . . , 16×16, 8×8, 4×4, 2×2, 1×1. The smaller mip-maps (<8×8) are each stored individually in a separate encoded data block.)

In the present embodiment, and in accordance with the technology described herein, each 4×4 block of texels 2 that is encoded as discussed above to represent the texture 1 in the present embodiment does not in fact represent a 4×4 rectangular sub-set of texels in the original texture map 1, but instead represents a non-rectangular sub-set of texels from the texture map 1.

Figures 2, 3:
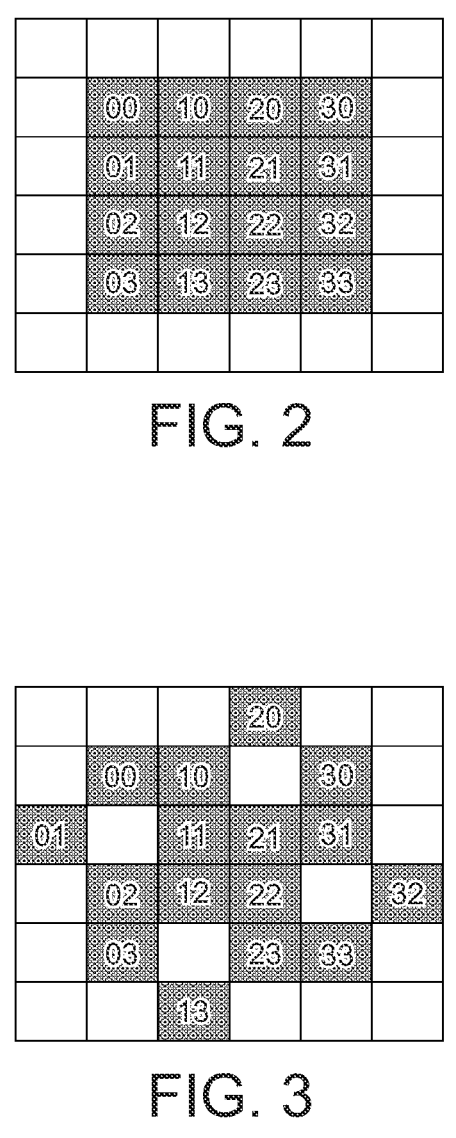

FIG. 2 shows an exemplary rectangular 4×4 sub-set of texels that could form a 4×4 block of texels to be encoded as an encoded texture data block. In this figure (and in the other figures, unless otherwise indicated), the texels in the block are indexed in raster order (with the indices being of the form XY, with each of X and Y indexed from 0), and the white squares are texels from adjacent blocks. This arrangement has the advantage that determining which encoded block a texel is in, and which texel it is within that block, is straightforward, as one can just divide the x and y coordinates of the texel by the block size (4 in this case) to determine the block a texel is in, and the remainder in x and y then identifies the texel position within the block.

As discussed above, this is the conventional arrangement for texture encoding schemes, but the Applicants have recognised can lead to visible block edge artefacts when the texture is decoded.

To reduce this problem, the present embodiment, in accordance with the technology described herein, configures each 4×4 block of texels that is encoded such that it in fact represents a non-rectangular sub-set of texels from the texture 1.

FIG. 3 shows the basic non-rectangular sub-set of texels that is used for this purpose in the present embodiment. As can be seen from FIG. 3, the non-rectangular shape in FIG. 3 still contains 16 texels (and so can be encoded (and decoded) with a block encoding scheme that uses 16 texel, 4×4 blocks as its input), and with reflections will also tessellate (tile) nicely across the texture, but no longer has the straight edges of the texel sub-set shown in FIG. 2. This shape, appropriately reflected for adjacent blocks, is used as the sub-sets of texels that the respective encoded texture data blocks 5 represent.

To achieve the texel sub-set configuration shown in FIG. 3, the present embodiment operates to swap texels between adjacent rectangular 4×4 sub-sets of texels in the texture 1 before the 4×4 sub-sets of texels are encoded to generate the encoded texture data blocks 5. This is illustrated in FIGS. 4 and 5.

FIG. 4 shows again an exemplary 4×4 sub-set of texels within the texture 1 with the texels indexed in x and y within the block, together with the corresponding texels from the four adjacent 4×4 texel sub-sets (blocks).

Figures 4, 5:
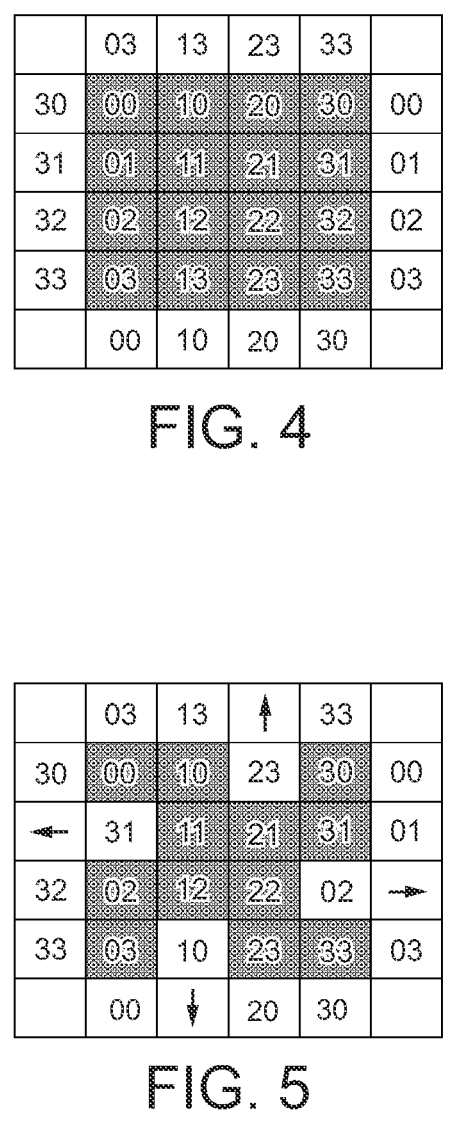

FIG. 5 then shows the swapping of texels between adjacent 4×4 sub-sets (blocks) to provide a 4×4 texel block that effectively represents the sub-set of texels shown in FIG. 3. Thus as can be seen from FIG. 5, the "23" texel, for example, from the 4×4 sub-set that is immediately above the sub-set shown in FIG. 5 is swapped with the "20" texel in the sub-set shown in FIG. 5 so that when the sub-set is encoded, instead of encoding its original "20" texel, the "23" texel from the adjacent sub-set (block) is encoded instead. This then has the effect that the upper edge of the sub-set being encoded has the shape shown in FIG. 3.

Similarly, for the other edges of the sub-set, respective texels along the sub-set edges are swapped with texels in the adjacent sub-sets, so that the respective texel positions in the block being encoded in fact encode texel positions that are spaced outwardly from the "base" rectangular 4×4 sub-set (block).

Essentially, a sub-set of the edge texels of a base 4×4 sub-set are identified and then swapped with texels from adjacent 4×4 sub-sets to generate a 4×4 block that represents a non-rectangular sub-set of texels from the original texture 1 for input to the encoding process. In this way, a 4×4 block of texels that represents a non-rectangular sub-set of texels from the texture 1 can be generated for input to the block encoding process.

In the present embodiment, the texels are always moved adjacent to their original positions, as this is advantageous. Also, because the encoded data is still spatially localised, there is no need to make any adjustments to the block encoding scheme. Other arrangements would, of course, be possible.

This process is repeated for each 4×4 sub-sets of texels in the original texture 1, to provide a set of 4×4 texel blocks 2 that each represent non-rectangular sub-sets of texels for encoding. Where a block lies at the edge of the texture, then that edge is simply left unadjusted, so as to maintain the straight edges of the texture 1 (i.e. if a texel lies at an edge of the texture, its position is not adjusted, as there is no adjacent block in that direction).

In the present embodiment, the sub-set of the edge texels that are shifted (swapped) to create the non-rectangular sub-sets of texels that are encoded are identified by numbering the texels clockwise along each edge, starting from zero, and then dividing this by a selected number which can be thought of as the "period". This effectively divides the edge texels into plural sets or groups, each the size of the "period". The remainder is then compared with another selected number which is referred to as the "phase" to identify which texel position should be shifted (swapped) (if the period is a power of 2, this can be achieved by comparing the number of lowest bits corresponding to the power in the power of two period (so the lowest bit if the period is 2 (2^1), the lowest two bits if the period is 4 (2^2), and so on) of the number of edge positions with the phase (and so is easy to implement in hardware). Effectively, the phase selects one texel position within each group of edge texels defined by the period to have its position swapped with an adjacent block.

The technology described herein uses a predetermined function in which the period and phase can be set to achieve this.

Other arrangements would, of course, be possible.

The texel shifting process is also configured such that the texel positions that are shifted are reversed for every other block. This allows for the fact that in order for the non-rectangular sub-sets of texels shown in FIG. 3 to tessellate properly across the texture, the texel positions that are shifted must differ for every other block. This can be seen from FIG. 5, for example, which shows that the texel position 20 is shifted in the top row of that block, whereas for the block immediately beneath that block, it is the texel position 10 that is shifted.

The period and phase values used for the texel shifting process can be selected as desired. However, a period that is a power of 2 is advantageous, as that makes implementation of the process in hardware more straightforward. Furthermore, the Applicants have found that the greatest effect seems to come when the period is set to 2. In this case, for even sized blocks, the phase has little effect, but for odd sized blocks the effect is more pleasing if the phase equals 1, as that tends to round-off the block corners.

The "texel swapping" processes may be implemented as desired, e.g. by using appropriately configured dedicated hardware elements (processing circuitry), or by programming a programmable more general processor (processing circuitry) to operate in the manner described.

Once each initial 4×4 texel sub-set has had its texels shifted into and swapped with texels in the appropriate adjacent blocks as illustrated in FIGS. 4 and 5 to generate the 4×4 blocks of texels that are to be encoded, the so-generated blocks of 4×4 texels each representing a non-rectangular sub-set of texels from the texture 1 can then be and are encoded to generate the encoded texture data blocks 5 that are to represent the texture 1. This encoding process can use any desired and, e.g., conventional, block-based texture encoding scheme, since the operation of the present embodiment only affects the positions of the texels (i.e. in which block they are encoded), not their values.

The present embodiment encodes each so-configured 4×4 texel block using the ASTC encoding scheme. However, other block-based encoding schemes, such as S3TC, ETC, BC6 or BC7, could be used if desired. Once all the blocks have been encoded, they can then be stored as a set of encoded texture data blocks 5 representing the texture 1 for later use, as is known in the art.

The encoding process for a block can be carried out in any suitable manner on or using the original texture data for the (non-rectangular) sub-set of texels that is to be encoded. For example, as in known prior art processes, the original data for the block could be encoded using some or all of the various different encoding and partitioning possibilities that are available (i.e. that, in effect, an encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block when it is encoded).

This should be done for each different texel sub-set that the original data (e.g. texture map) has been divided into for encoding purposes.

The process may then be repeated using a different block size, and so on, if desired, until the block size and encoding arrangements giving the least error (or at least a sufficiently small error) is found, which may then be selected as the encoding arrangement to use for the texture.

The original texture may then be encoded using the determined block size and the encoding arrangement determined for each block (or the already encoded blocks from the testing used, if they have been retained), to produce a stream or set of encoded texture data blocks representing, and corresponding to, the original set of data (e.g. texture map). This set of encoded texture data blocks can then be stored, e.g. on a portable storage device such as a DVD, for later use, e.g. when it is desired to apply the texture to an image to be rendered.

In an embodiment a set of mipmaps is generated to represent the texture, with each mipmap in an embodiment being generated in the above manner. Where mipmaps are used, the compression rate (and bit rate) is in an embodiment varied for (is different for) different mipmap levels, with higher bit rates (i.e. lower levels of data compression) being used for smaller mipmap levels (i.e. lower resolution mipmap levels).

Each block that the original data (e.g. texture map) is divided into is in an embodiment the same size and configuration. The block size that is being used is provided to the decoder. This may be done, for example, by including (indicating) the block size in a (global) data header that is associated with (attached to) the set of encoded texture data blocks, or in any other suitable manner.

The selection algorithm can use any desired (and many different) testing schemes such as, for example, measuring the peak signal-to-noise ratio between the encoded version of a block and the original version of the block.

The encoding can be carried out as desired, e.g. using a suitably programmed general-purpose processor that, e.g., has access to the original texture data in memory, or a suitable dedicated processor could be used.

The above describes the encoding process used for the encoding scheme used in the embodiment of the technology described herein. As will be appreciated by those skilled in the art, the decoding process will be carried out in a corresponding converse manner.

The decoding process to determine the value of a given texel (texture data element) from the set of encoded texture data blocks representing the texture 1 will now be described.

To determine the value of a given texel whose value is required, the decoder first identifies a candidate encoded texture data block 5 and relative texel position (index) within that block for the texel in question. The candidate encoded texture data block is identified by dividing the texel's position coordinates by the block size. The texel position within that candidate block is then determined by taking the (integer) remainder of the division.

It is then determined whether to use the identified candidate encoded texture data block to determine the texel's value, or whether an adjacent block should in fact be used (essentially whether the texel in question was in fact shifted to a different encoded texture data block as part of the encoding process).

To do this, the decoding process determines whether the determined relative position of the texel of interest within the identified initial candidate texture data block is a position within the base rectangular array of texels that the encoded block effectively represents that was in fact shifted to an adjacent block as part of the encoding process. This is done by using a function that uses the period and phase values used in the encoding process to determine whether the texel position lies at a shifted position or not. If the texel does then lie at a shifted position within the initial candidate block, the block and texel position to use for the decoding process are adjusted appropriately. Otherwise, the texel is simply decoded using the initial candidate block and position within that block.

The decoding process also operates to determine if the texel lies at the edge of the texture, and in that case, simply decodes the texture using the identified candidate block and position.

Similarly, the decoding process is configured to take account of the fact that in the present embodiment different texel positions are shifted in different adjacent encoded blocks so as to ensure that the non-rectangular sub-sets of texels that are encoded tessellate properly across the texture.

Exemplary code which will achieve this (i.e. calculate the encoded block and relative texel position (index) to use when decoding a texel), given the x, y coordinates of the texel to decode, the block (sub-set) size (the width and height) (w, h) used when encoding the texture, and the overall texture size, is as follows:

```
# Determine initial candidate block index
bx=int(x/w)
by=int(y/h)
# Determine relative texel position (index) within candidate block
xx=int(x % w)
yy=int(y % h)
# Reflect xx and yy on alternate encoded blocks (hardware: mux) to adjust texel positions that trigger using another encoded block
if(((bx^by)&1)!=0):
    xp=xx
    yp=YY
    xm=w-1-xx
    ym=h-1-yy
else:
    xm=xx
    ym=YY
    xp=w-1-xx
    yp=h-1-yy
# Deal with texture edges—don't adjust encoded block and texel position if texel is right on the edge of the texture
if(y>0 and y<image_ymax):
    # Adjust block and texel index in y
    if(yy==0 and (xp % period)==phase):
        by-=1
        yy=yy^(h-1)
    elif(yy==h-1 and (xm % period)==phase):
        by+=1
        yy=yy^(h-1)
if(x>0 and x<image_xmax):
    # Adjust block and texel index in x
    if(xx==0 and (ym % period)==phase):
        bx-=1
        xx=xx^(w-1)
    elif(xx==w-1 and (yp % period)==phase):
        bx+=1
        xx=xx^(w-1)
```

At the end of this routine, bx and by will indicate the x and y coordinates of the encoded texture data block 5 to use to determine the texel's value, and xx and yy will be the coordinates of the texel to be decoded within that block (i.e. the relative position of the texel within the block). If the period is a power of 2, this is straightforward to implement in hardware.

The determination of the encoded texture data block 5 and the texel position to use within that block to be used to determine the texel's value is in an embodiment implemented as a dedicated hardware element in the decoder.

It should also be appreciated here that the encoding process can simply use the inverse of the above procedure to re-order the texels (to shift the texels) in the texture before generating the encoded texture data blocks representing each 4×4 block of texels.

Once the encoded texture data block 5 and the texel position within that block to be used to determine the texels' value have been identified in the above manner, then the texel value can be determined by decoding the identified encoded texture data block in the conventional manner for the block encoding scheme being used (i.e. in the present embodiment using the ASTC decoding process, or, where other encoding schemes have been used, using those decoders appropriately).

This process can then be repeated for each texel value that is required, and the so-generated, decoded texel values then applied to sampling positions (fragments), etc., that are being rendered to generate rendered data for those sampling positions (fragments), which rendered data is then, e.g., written to the frame buffer for a display to display the "textured" sampling positions and/or fragments.

As will be appreciated from the above, in the decoding arrangements, the actual data values (e.g. in terms of their format and what they represent) that are generated for the set of data values to be used for a texture data block and for the individual texture data elements will depend on the nature of the texture data that is being encoded. Thus, for example, as discussed above, in the case of colour data and colour maps, each data value will represent a given colour, and, e.g., comprise a set of colour values, such as RGB or RGBA values. On the other hand, for a luminance map, each data value may comprise and represent a single luminance value. For normal-maps (bump maps), each data value will comprise a set of components representing a normal vector, and for shadow maps (light maps), each data value will comprise and represent a set of values indicating, e.g., the presence or absence, and amount of, light or shadow, and so on.

Figure 6:
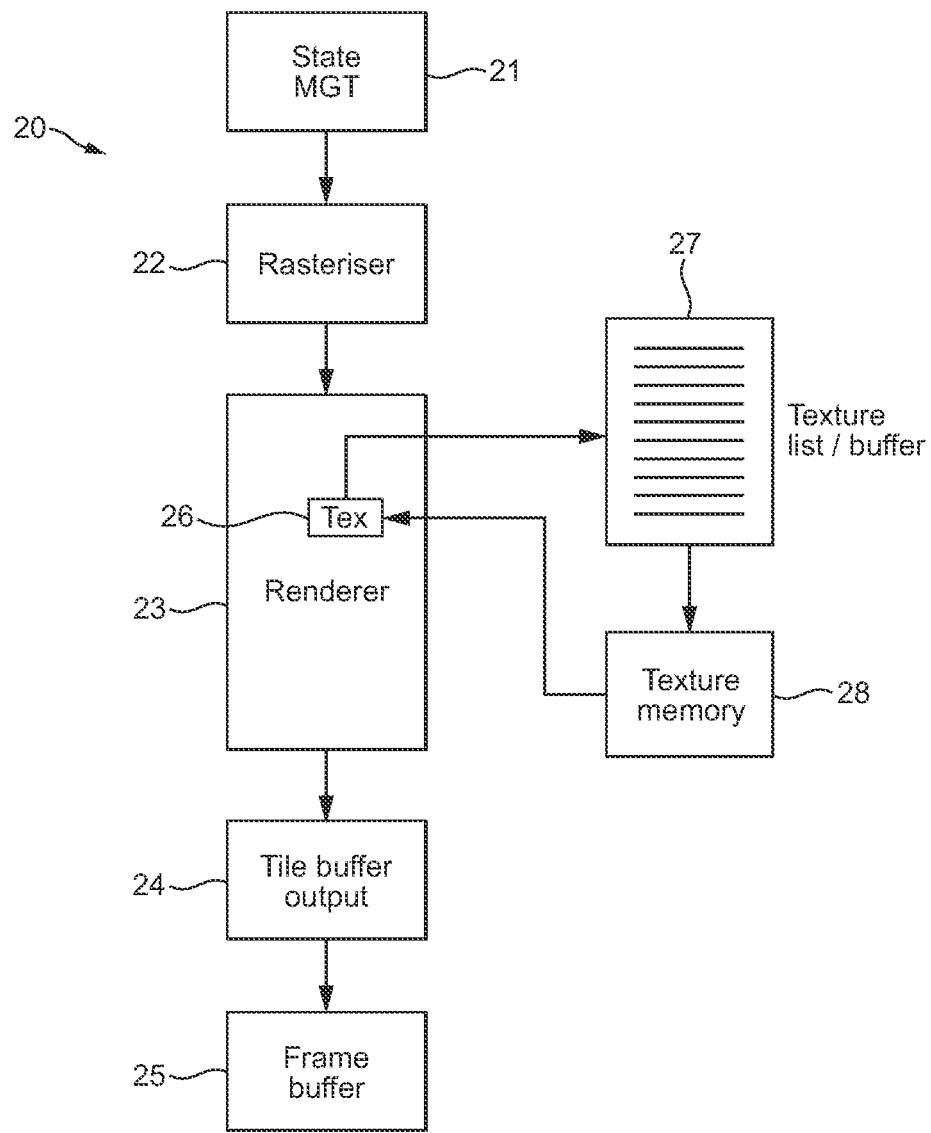
FIG. 6 shows schematically a graphics processing system that can use texture data that has been encoded in the manner of the described embodiment of the technology described herein.

FIG. 6 shows schematically an arrangement of a graphics processing system 20 that can use textures that have been encoded in accordance with the present embodiment. In this embodiment, the graphics processing system 20 is a tile-based rendering system. However, other arrangements are, of course, possible.

As shown in FIG. 6, the graphics processing system 20 includes a state management system 21, a rasterising stage 22, and a rendering stage 23 in the form of a rendering pipeline. It will be appreciated that each of the stages, elements, and units, etc., of the graphics processor 20 as shown in FIG. 6 may be implemented as desired and will accordingly comprise, e.g., appropriate circuitry, and/or processing logic, etc., for performing the necessary operation and functions.

The state management system 21 stores and controls state data and the state of the graphics processing units to control the graphics processing operation, as is known in the art.

The rasteriser 22 takes as its input primitives to be displayed, and rasterises those primitives to sampling positions and generates fragments to be rendered, as is known in the art.

The rendering pipeline 23 takes fragments from the rasteriser 22 and renders those fragments for display. As is known in the art, the rendering pipeline 23 will include a number of different processing units, such as fragment shaders, blenders, texture mappers, etc.

The output from the rendering pipeline 23 (the rendered fragments) is output to tile buffers 24 (since the present embodiment is a tile-based system). The tile buffers' outputs are then finally output to a frame buffer 25 for display.

FIG. 6 also shows schematically particular features of the graphics processing system 20 that are provided in order for it to use textures encoded in the manner of the present embodiment.

In particular, as shown in FIG. 6, the rendering pipeline 23 includes a texture mapping stage 26 configured to be able to access a texture list buffer 27 to determine a texture needed for texturing a fragment that it receives for rendering.

The texture list buffer 27 will indicate the texture that is required, and then, as is known in the art, the texture mapper 26 will fetch the relevant texture data from a memory 28 and used the fetched texture data to process the fragment in question.

The textures stored in the texture memory 28 are stored using the encoding format of the present embodiment. Thus, when the texture mapper 26 needs a given texel or texels for applying to a fragment being rendered, it will determine the texture map and encoded block within that map that it needs for the texel in question based on the position of the texel in the manner discussed above, retrieve that block from the memory 28 and then determine the texel's value (e.g. colours) from the encoded block in the appropriate manner.

The texture mapper 26 includes a suitable decoder (decoding circuitry) to do this. This decoder may, e.g., be in the form of a dedicated hardware element that is configured to decode textures encoded in the form of the present embodiment, or it may, e.g., comprise programmable processing circuitry that has been programmed appropriately to be able to decode textures encoded in the form of the present embodiment. In an embodiment a dedicated hardware decoder is used. This decoder will, inter alia, implement the encoded block and texel position determining function of the present embodiment.

It will be appreciated from the above that the encoding and decoding processes of the present embodiment essentially comprise, on the encoding side, firstly reordering (shifting the positions of) the texels in the texture to be encoded using the inverse of the above decoding texel position shifting function, and then dividing the texture to be encoded into, in this case 4×4, rectangular blocks of texels and encoding those blocks of texels using a conventional block based encoding scheme.

Then, on the decoding side, the decoder firstly identifies a candidate encoded block and texel position within that block using the position of the texel whose value is required in the conventional manner. The texel's position within the block is then used to determine whether to, and how to, adjust the encoded block to use and the texel position within the block to use in the above manner.

Once the encoded texture data block and texel position within that block to use to determine the texel's value has been identified, the encoded texture data block in question can then be decoded using the appropriate (and, e.g., a conventional) block based decoding scheme in the usual manner.

Figure 7:
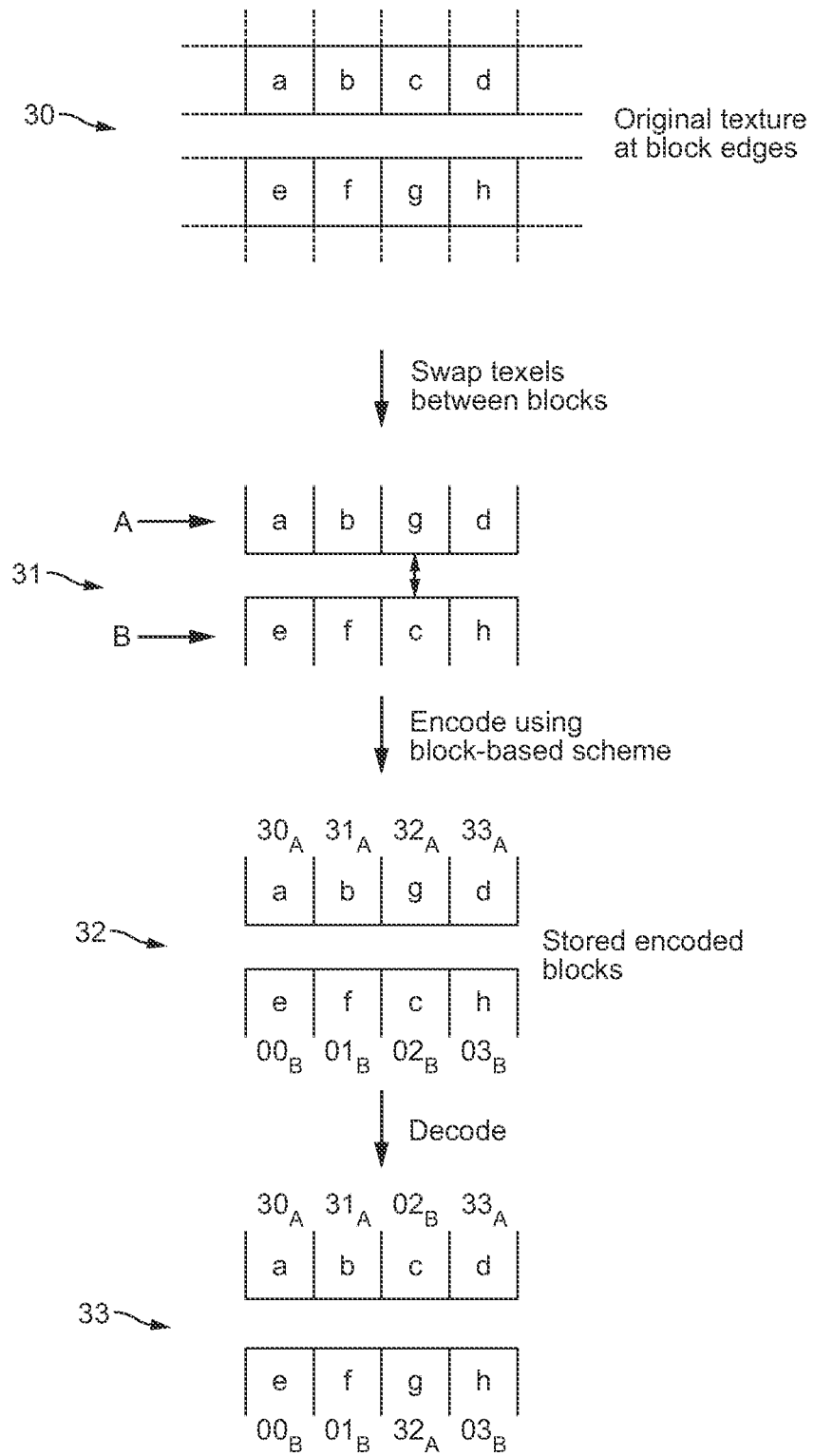
FIG. 7 illustrates the texture data encoding and decoding process of the described embodiment of the technology described herein.

FIG. 7 illustrates this and shows schematically an original texture to be encoded at two adjacent block edges 30. This is the arrangement of the texels that should be recreated when the encoded texture is decoded.

FIG. 7 then shows the configuration 31 of these block edges after the texel positions in the original texture have been shifted using the inverse of the above described texel shifting decoding function. It can be seen that texels c and g have had their positions swapped.

The so-configured blocks A, B are then compressed using a block-based encoding scheme (in this case the ASTC encoding scheme) to provide a pair of encoded (and compressed) texture data blocks 32 having the configuration shown in FIG. 7.

FIG. 7 also shows the texel indexes for each respective texel. Thus, for example, texel a is in encoded block A, index 30 (30A), texel b is in encoded block A, index 31 (31B), texel c is in encoded block B, index 02 (02B), and so on.

FIG. 7 finally shows that when decoding takes place, the encoded texture data block and texel position determining function described above will operate to determine the texel values from the correct encoded blocks to thereby allow the correct, original texture 33 to be reproduced (with the texels in the correct positions) when the encoded texture is decoded.

Thus, in particular, as shown in FIG. 7, texel a will be decoded using texel 30 in encoded block A, texel b will be decoded using texel 31 in encoded block A and texel d will be decoded using texel 33 in encoded block A, but texel c will be decoded using texel 02 in encoded block B.

Similarly, texel e will be decoded using texel 00 in encoded block B, texel f will be decoded using texel 01 in encoded block B and texel h will be decoded using texel 03 in encoded block B, but texel g will be decoded using texel 32 in encoded block A.

Figure 8:
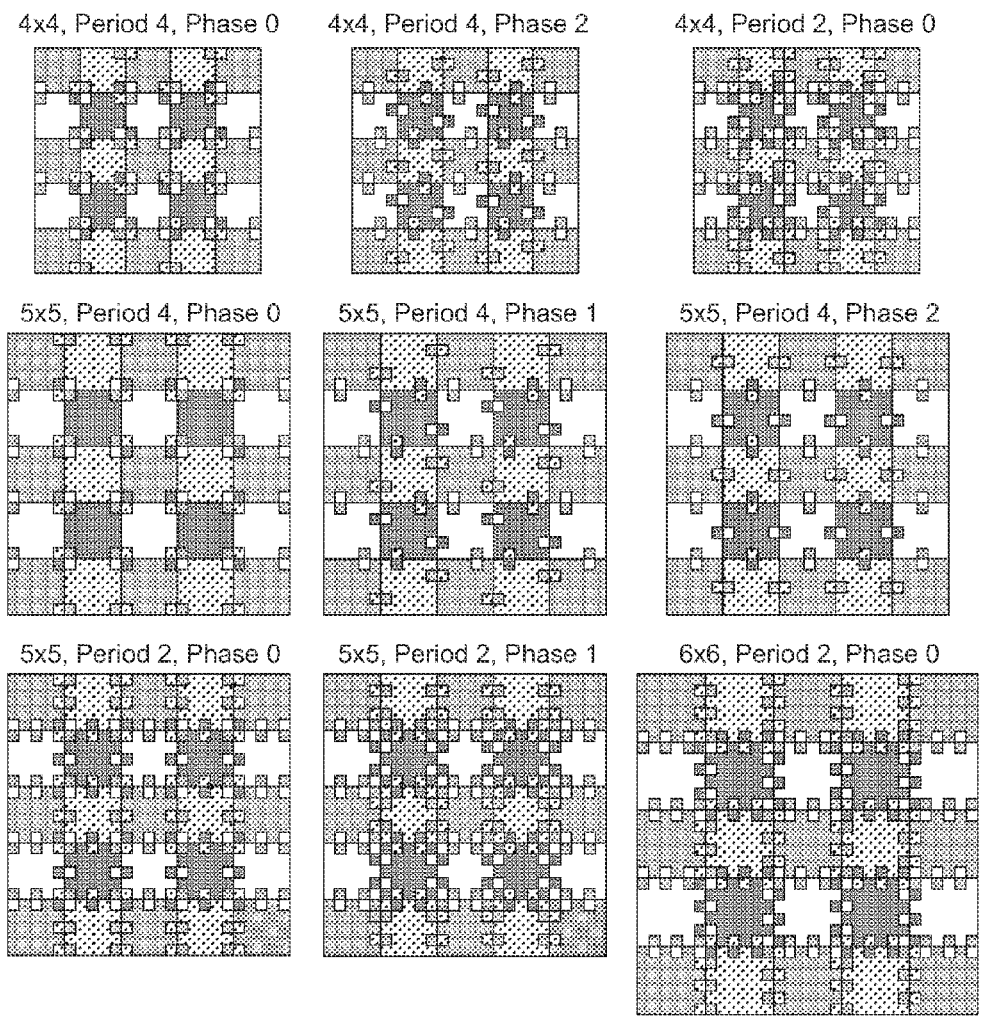
FIGS. 8 and 9 show exemplary textures that have been encoded in the manner of the described embodiment of the technology described herein.
Figure 9:
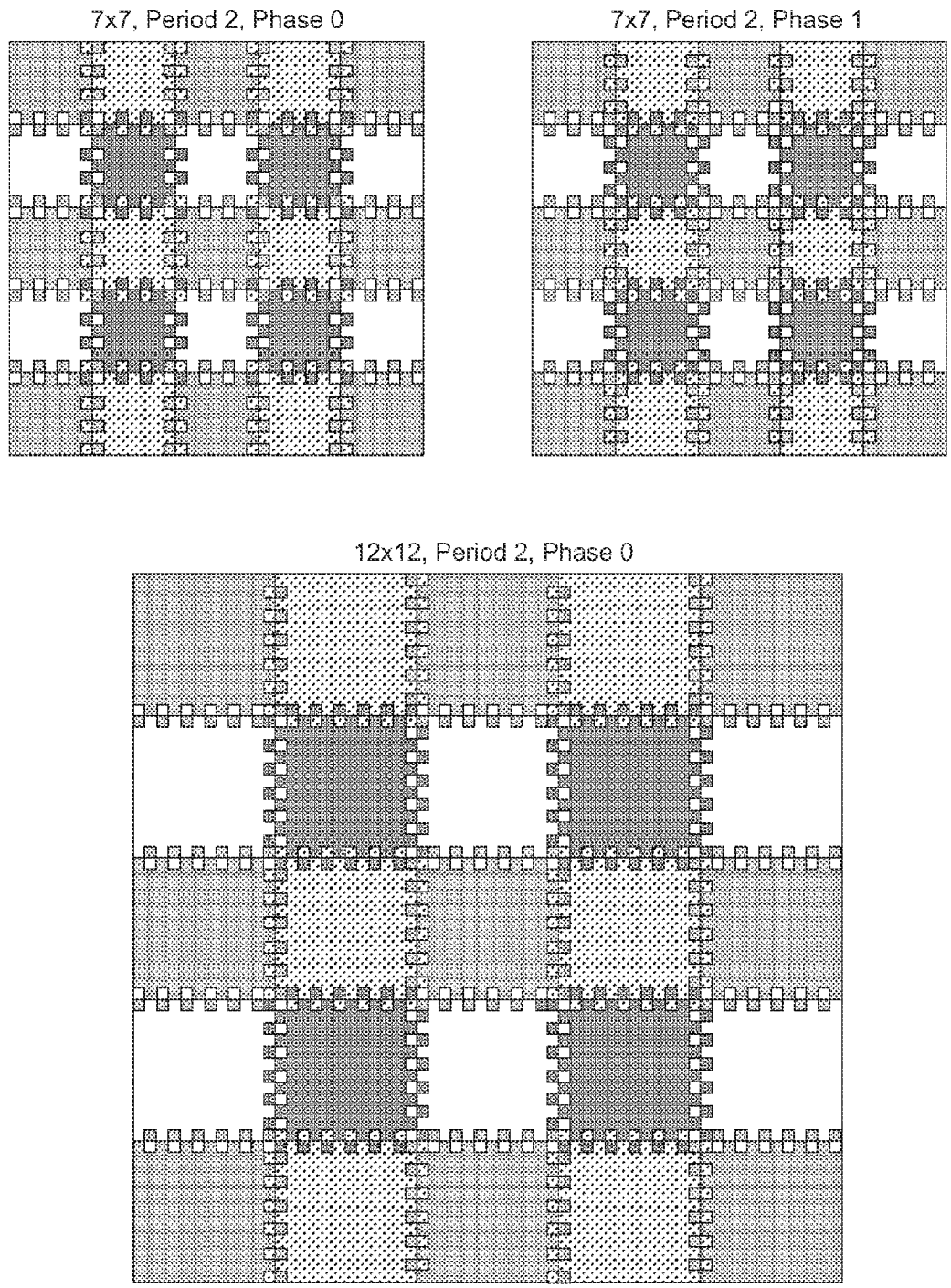

FIGS. 8 and 9 show some exemplary test patterns generated using the arrangement of the present embodiment for different block sizes, periods and phases. Each arrangement shows a 5×5 array of blocks, so as to illustrate every combination of interior and edge block shape. Each block is given one of four different colours for illustration purposes.

It can be seen from these exemplary arrangements that block edge artefacts in the decoded image will be reduced.

Although the above embodiment has been described with reference to texture data in the form of colours, as discussed above, and as will be appreciated by those skilled in the art, the technology described herein is also applicable to other forms of texture data, such as luminance-maps or bump-maps, etc., and to other, non-texture data. In such arrangements the data can be encoded or decoded in an advantageous manner, but each data value will, e.g., represent a luminance value or normal vector, etc., rather than a colour.

Similarly, although the present embodiment has been described primarily with reference to the encoding of square 2D blocks of texels, other texel block arrangements and configurations would be possible, if desired. For example, the technology described herein could be equally used when encoding 3D textures, to allow non-cuboid 3D blocks of texels to be encoded. In the 3D case, the "edges" of the blocks will be the planes (faces) of texels between the blocks.

A number of variations and modifications to the described embodiment of the technology described herein would be possible, if desired.

For example, instead of using the ASTC encoding format to encode (and decode) the texel blocks, other block-based encoding schemes, such as ETC, S3TC, BC6 and BC7, could be used to encode (and decode) the texel blocks.

As can be seen from the above, the technology described herein can provide, in its embodiments at least, a method and system that encodes non-rectangular sub-sets (blocks) of texels (thereby avoiding block edge artefacts appearing in the decoded texture), but which can still provide relatively straightforward random access to individual texels in the encoded texture and that can be used with conventional and standard block-based encoding schemes.

This is achieved, in the embodiments of the technology described herein at least, by, in effect, swapping texels in a texture to be encoded between adjacent blocks of texels before encoding the blocks of texels, and then on the decoding side, using the texel's position and the block size to identify a candidate encoded block to be used to determine the texel's value, but then determining if the texel lies at a position that indicates that another encoded block should in fact be used to determine the texel's value or not.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

What is claimed is:

1. A method of encoding an array of texture data elements to be used in a graphics processing system, the method comprising:
   encoding the array of texture data elements as a plurality of encoded texture data blocks, each encoded texture data block representing a sub-set of the texture data elements of the array of texture data elements to be encoded and containing data to allow decoded data values for the sub-set of the texture data elements that the block represents to be determined; and wherein:
   at least two of the encoded texture data blocks represent respective non-rectangular sub-sets of texture data elements from the array of texture data elements to be encoded, the non-rectangular sub-sets of texture data elements are in the form of rectangles, the edges of which have been modified so that they are not straight lines and so that they interlock with the edges of adjacent non-rectangular sub-sets of texture data elements in the array of texture data elements.

2. The method of claim 1, comprising:
   dividing the array of texture data elements into a plurality of non-rectangular sub-sets of texture data elements; and
   encoding the non-rectangular sub-sets of texture data elements that the texture has been divided into to provide a set of encoded texture data blocks representing the texture.

3. The method of claim 1, comprising dividing the array of texture data elements into a plurality of non-rectangular sub-sets of texture data elements that each contain the same square number of texture data elements.

4. The method of claim 1, wherein the non-rectangular sub-sets of texture data elements that are encoded are configured such that the array of texture data elements has effectively been divided into a plurality of smaller rectangular sub-sets of texture data elements, and then, for each adjoining pair of the rectangular sub-sets of texture data elements, at least one pair of texture data elements has been swapped between the sub-sets, such that when the sub-sets are encoded, each sub-set of the pair of sub-sets then contains at least one texture data element from the other sub-set of the pair of sub-sets in the place of a texture data element that was originally in the sub-set.

5. The method of claim 1, further comprising the encoding process identifying the edges of the array of texture data elements to be encoded, and keeping any texture data element sub-set edge that lies along an edge of the array of texture data elements as a straight line.

6. A method of determining a texture data element value for use in a graphics processing system from a set of encoded texture data blocks representing a texture to be used in the graphics processing system, the method comprising:
   using the position of a texture data element whose value is required and the block size used for the set of encoded texture data blocks representing the texture to be decoded to determine a candidate encoded texture data block in the set of encoded texture data blocks representing the texture to use to determine the value to use for the texture data element whose value is required; and
   using a relative position within the determined candidate encoded texture data block for the texture data element whose value is required to determine whether to use the determined candidate encoded texture data block to determine the value to use for the texture data element whose value is required, or whether to use another encoded texture data block to determine the value to use for the texture data element whose value is required; and
   if it is determined to use the determined candidate encoded texture data block to determine the value to use for the texture data element whose value is required, using the candidate encoded texture data block to determine the value to use for the texture data element whose value is required; and
   if it is determined to use another encoded texture data block to determine the value to use for the texture data element whose value is required, using the another encoded texture data block to determine the value to use for the texture data element whose value is required.

7. The method of claim 6, wherein the position of the texture data element whose value is required is used to determine the relative position within the candidate encoded texture data block that is used to determine whether to use the candidate encoded texture data block or another encoded texture data block to determine the value to use for the texture data element whose value is required.

8. The method of claim 6, wherein every other relative texture data element position on the edge of a candidate encoded texture data block that adjoins another encoded texture data block in the set of encoded texture data blocks representing the texture indicates that another encoded texture data block should be used to determine the value to use for a texture data element whose value is required.

9. The method of claim 6, wherein the encoded texture data block that adjoins the edge of the candidate encoded texture data block that the relative position of the texture data element whose value is required lies on, or is nearest to, is selected as the another encoded texture data block to be used to determine the value of the texture data element in question.

10. The method of claim 6, further comprising where it is determined that another encoded texture data block should be used to decode the texture data element in question, also determining a new, adjusted relative position for the texture data element in the another encoded texture data block to be used when determining the value of the texture data element using the another encoded texture data block.

11. The method of claim 6, further comprising determining if the texture data element whose value is to be determined lies on an outer edge of the texture, and if it does, then determining the texture data element's value using the determined candidate encoded texture data block.

12. The method of claim 6, further comprising for certain selected encoded texture data blocks in the set of encoded texture data blocks representing the texture, adjusting the relative texture data element positions within the encoded texture data block that will trigger the use of another encoded texture data block before using the relative position of the texture data element within the encoded texture data block to determine whether to use the encoded texture data block or another encoded texture data block to determine the texture data element's value.

13. An apparatus for encoding an array of texture data elements to be used in a graphics processing system, the apparatus comprising:
   processing circuitry configured to encode the array of texture data elements as a plurality of encoded texture data blocks, each encoded texture data block representing a sub-set of the texture data elements of the array of texture data elements to be encoded and containing data to allow decoded data values for the sub-set of the texture data elements that the block represents to be determined; and wherein:
   at least two of the encoded texture data blocks represents respective non-rectangular sub-sets of texture data elements from the array of texture data elements to be encoded, the non-rectangular sub-sets of texture data elements are in the form of rectangles, the edges of which have been modified so that they are not straight lines and so that they interlock with the edges of adjacent non-rectangular sub-sets of texture data elements in the array of texture data elements.

14. The apparatus of claim 13, comprising:
   processing circuitry configured to:
   divide the array of texture data elements into a plurality of non-rectangular sub-sets of texture data elements; and
   encode the non-rectangular sub-sets of texture data elements that the texture data array has been divided into to provide a set of encoded texture data blocks representing the array of texture data elements.

15. The apparatus of claim 13, wherein the array of texture data elements is divided into a plurality of non-rectangular sub-sets of texture data elements that each contain the same square number of texture data elements.

16. The apparatus of claim 13, wherein the non-rectangular sub-sets of texture data elements that are encoded are configured such that the array of texture data elements has effectively been divided into a plurality of smaller rectangular sub-sets of texture data elements, and then, for each adjoining pair of the rectangular sub-sets of texture data elements, at least one pair of texture data elements has been swapped between the sub-sets, such that when the sub-sets are encoded, each sub-set of the pair of sub-sets then contains at least one texture data element from the other sub-set of the pair of sub-sets in the place of a texture data element that was originally in the sub-set.

17. The apparatus of claim 13, further comprising processing circuitry configured to identify the edges of an array of texture data elements to be encoded, and to keep any texture data element sub-set edge that lies along an edge of the array of texture data elements as a straight line.

18. An apparatus for determining a texture data element value for use in a graphics processing system from a set of encoded texture data blocks representing a texture to be used in the graphics processing system, the apparatus comprising:
   processing circuitry configured to:
   use the position of a texture data element whose value is required and the block size used for the set of encoded texture data blocks representing a texture to be decoded to determine a candidate encoded texture data block in the set of encoded texture data blocks representing the texture to use to determine the value to use for the texture data element whose value is required; and
   use a relative position within the determined candidate encoded texture data block for the texture data element whose value is required to determine whether to use the determined candidate encoded texture data block to determine the value to use for the texture data element whose value is required, or whether to use another encoded texture data block to determine the value to use for the texture data element whose value is required; and
   if it is determined to use the determined candidate encoded texture data block to determine the value to use for the texture data element whose value is required, use the candidate encoded texture data block to determine the value to use for the texture data element whose value is required; and
   if it is determined to use another encoded texture data block to determine the value to use for the texture data element whose value is required, use the another encoded texture data block to determine the value to use for the texture data element whose value is required.

19. The apparatus of claim 18, wherein the position of a texture data element whose value is required is used to determine the relative position within the candidate encoded texture data block that is used to determine whether to use the candidate encoded texture data block or another encoded texture data block to determine the value to use for the texture data element whose value is required.

20. The apparatus of claim 18, wherein every other relative texture data element position on the edge of a candidate encoded texture data block that adjoins another encoded texture data block in the set of encoded texture data blocks representing the texture indicates that another encoded texture data block should be used to determine the value to use for the texture data element whose value is required.

21. The apparatus of claim 18, wherein the encoded texture data block that adjoins the edge of the candidate encoded texture data block that the relative position of a texture data element whose value is required lies on, or is nearest to, is selected as the another encoded texture data block to be used to determine the value of the texture data element in question.

22. The apparatus of claim 18, further comprising processing circuitry configured to, where it is determined that another encoded texture data block should be used to decode the texture data element in question, also determine a new, adjusted relative position for the texture data element in the another encoded texture data block to be used when determining the value of the texture data element using the another encoded texture data block.

23. The apparatus of claim 18, further comprising processing circuitry configured to determine if a texture data element whose value is to be determined lies on an outer edge of the texture, and if it does, then determine the texture data element's value using the determined candidate encoded texture data block.

24. The apparatus of claim 18, further comprising processing circuitry configured to adjust, for certain selected encoded texture data blocks in a set of encoded texture data blocks representing a texture, the relative texture data element positions within the encoded texture data block that will trigger the use of another encoded texture data block, before the relative position of the texture data element within the encoded texture data block is used to determine whether to use the encoded texture data block or another encoded texture data block to determine the texture data element's value.

25. A graphics processing unit comprising processing circuitry configured to, when a texture data element value from a set of encoded texture data blocks representing a texture to be used by the graphics processing unit is required:
- use the position of a texture data element whose value is required and the block size used for a set of encoded texture data blocks representing a texture to be decoded to determine a candidate encoded texture data block in the set of encoded texture data blocks representing the texture to use to determine the value to use for the texture data element whose value is required; and
- use a relative position within the determined candidate encoded texture data block for the texture data element whose value is required to determine whether to use the determined candidate encoded texture data block to determine the value to use for the texture data element whose value is required, or whether to use another encoded texture data block to determine the value to use for the texture data element whose value is required; and
- if it is determined to use the determined candidate encoded texture data block to determine the value to use for the texture data element whose value is required, use the candidate encoded texture data block to determine the value to use for the texture data element whose value is required; and
- if it is determined to use another encoded texture data block to determine the value to use for the texture data element whose value is required, use the another encoded texture data block to determine the value to use for the texture data element whose value is required.

26. A non-transitory computer readable storage medium storing computer software code which when executing on a processor performs a method of encoding an array of texture data elements to be used in a graphics processing system, the method comprising:
- encoding the array of texture data elements as a plurality of encoded texture data blocks, each encoded texture data block representing a sub-set of the texture data elements of the array of texture data elements to be encoded and containing data to allow decoded data values for the sub-set of the texture data elements that the block represents to be determined; and wherein:
- at least two of the encoded texture data blocks represent respective non-rectangular sub-sets of texture data elements from the array of texture data elements to be encoded, the non-rectangular sub-sets of texture data elements are in the form of rectangles, the edges of which have been modified so that they are not straight lines and so that they interlock with the edges of adjacent non-rectangular sub-sets of texture data elements in the array of texture data elements.

* * * * *

UNITED STATES PATENT AND TRADEMARK OFFICE
CERTIFICATE OF CORRECTION

| | | |
|---|---|---|
| PATENT NO. | : 9,177,415 B2 | Page 1 of 1 |
| APPLICATION NO. | : 13/753921 | |
| DATED | : November 3, 2015 | |
| INVENTOR(S) | : Ellis | |

It is certified that error appears in the above-identified patent and that said Letters Patent is hereby corrected as shown below:

In the claims,

Column 45, lines 22-23, claim 13: After "blocks" and before "respective", please delete "represents" and replace with -- represent --

Signed and Sealed this
Tenth Day of May, 2016

Michelle K. Lee
*Director of the United States Patent and Trademark Office*